US010396927B2

(12) United States Patent
Harel

(10) Patent No.: US 10,396,927 B2
(45) Date of Patent: Aug. 27, 2019

(54) AUTOMATIC CONFIGURATION OF CELL ASSIGNMENT OF NON-INTER-CELL INTERFERENCE COORDINATION (NON-ICIC)-ENGAGED REMOTE UNITS IN A WIRELESS DISTRIBUTED COMMUNICATIONS SYSTEM (WDCS) TO NON-ICIC-ENGAGED WDCS CELLS TO AVOID OR REDUCE DIVIDING RADIO RESOURCES

(71) Applicant: Corning Optical Communications LLC, Hickory, NC (US)

(72) Inventor: Dror Harel, Hod Hasharon (IL)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/838,911

(22) Filed: Dec. 12, 2017

(65) Prior Publication Data

US 2019/0181973 A1    Jun. 13, 2019

(51) Int. Cl.
*H04J 11/00* (2006.01)
*H04W 16/32* (2009.01)
(Continued)

(52) U.S. Cl.
CPC .......... *H04J 11/0056* (2013.01); *H04B 10/40* (2013.01); *H04W 16/14* (2013.01);
(Continued)

(58) Field of Classification Search
None
See application file for complete search history.

(56) References Cited

U.S. PATENT DOCUMENTS 8,346,173 B2 * 1/2013 Chen ................... H04W 72/082
370/329
8,971,818 B2 * 3/2015 Maaref ................ H04W 16/10
455/67.11
(Continued)

FOREIGN PATENT DOCUMENTS

WO    2016199130 A1    12/2016

OTHER PUBLICATIONS

International Search Report and Written Opinion of the International Searching Authority; PCT/IL2018/051247: dated Jan. 30, 2019; 14 Pages; European Patent Office.

*Primary Examiner* — Mohammed Rachedine
(74) *Attorney, Agent, or Firm* — C. Keith Montgomery

(57) ABSTRACT

Automatic configuration of cell assignment of non-Inter-Cell Interference Coordination (ICIC)-engaged remote units in a wireless distribution communications system (WDCS) to non-ICIC-engaged WDCS cells to avoid or reduce dividing radio resources. The WDCS is configured to identify which remote units are "ICIC-engaged remote units." A cell assignment configuration circuit is configured to identify ICIC-engaged WDCS cell(s) (i.e., in ICIC relation with a neighboring cell) among the WDCS cells in the WDCS, based on determining the WDCS cells assigned to ICIC-engaged remote units. The cell assignment configuration circuit is configured to determine a cell assignment configuration for the WDCS based on reassigning non-ICIC-engaged remote units assigned to the identified ICIC-engaged WDCS cells to non-ICIC-engaged WDCS cells. In this manner, radio resources for servicing non-ICIC-engaged remote units are not divided among non-ICIC-engaged remote units.

30 Claims, 14 Drawing Sheets

(51) Int. Cl.
  *H04B 10/40* (2013.01)
  *H04W 16/14* (2009.01)
  *H04W 88/10* (2009.01)
  *H04W 72/08* (2009.01)

(52) U.S. Cl.
  CPC ............ *H04W 16/32* (2013.01); *H04W 88/10* (2013.01); *H04W 72/082* (2013.01)

(56) References Cited

U.S. PATENT DOCUMENTS

| | | | |
|---|---|---|---|
| 8,989,152 B1 * | 3/2015 | Oroskar | H04W 72/1226 370/329 |
| 9,031,591 B2 * | 5/2015 | Ma | H04W 16/10 455/450 |
| 9,178,635 B2 | 11/2015 | Ben-Shlomo | |
| 9,515,855 B2 | 12/2016 | Harel | |
| 9,525,472 B2 | 12/2016 | George et al. | |
| 9,559,798 B2 * | 1/2017 | Nuss | H04W 16/10 |
| 9,584,494 B2 | 2/2017 | Lim et al. | |
| 9,603,155 B2 * | 3/2017 | Daniel | H04B 10/25753 |
| 9,807,700 B2 | 10/2017 | Harel | |
| 9,813,127 B2 | 11/2017 | George et al. | |
| 9,882,669 B1 | 1/2018 | Schartzman | |
| 10,116,402 B2 * | 10/2018 | Ma | H04W 72/08 |
| 2014/0162664 A1 | 6/2014 | Stapleton et al. | |
| 2014/0211734 A1 | 7/2014 | Seo et al. | |
| 2016/0135197 A1 | 5/2016 | Kang et al. | |

* cited by examiner

AUTOMATIC CONFIGURATION OF CELL ASSIGNMENT OF NON-INTER-CELL INTERFERENCE COORDINATION (NON-ICIC)-ENGAGED REMOTE UNITS IN A WIRELESS DISTRIBUTED COMMUNICATIONS SYSTEM (WDCS) TO NON-ICIC-ENGAGED WDCS CELLS TO AVOID OR REDUCE DIVIDING RADIO RESOURCES

BACKGROUND

The disclosure relates generally to wireless distributed communications systems (WDCSs), including but not limited to distributed antenna systems (DASs), remote radio head (RRH) systems, and small radio cell systems, and more particularly to automatic configuration of cell assignment of non-Inter-Cell Interference Coordination (ICIC)-engaged remote units in a WDCS to non-ICIC-engaged WDCS cells to avoid or reduce dividing radio resources (e.g., radio resource matrix (RRM) resources) to remote units.

Wireless customers are increasingly demanding wireless communications services, such as cellular communications services and Wireless Fidelity (WiFi) services. Thus, small cells, and more recently WiFi services, are being deployed indoors. At the same time, some wireless customers use their wireless communications devices in areas that are poorly serviced by conventional cellular networks, such as inside certain buildings or areas where there is little cellular coverage. One response to the intersection of these two concerns has been the use of WDCSs. Examples of WDCSs include DASs, RRH systems, and small radio cell systems (e.g., femotcells systems). WDCSs include remote units configured to receive and transmit downlink communications signals to client devices within the antenna range of the respective remote units. WDCSs can be particularly useful when deployed inside buildings or other indoor environments where the wireless communication devices may not otherwise be able to effectively receive radio frequency (RF) signals from a source.

In this regard, FIG. 1 illustrates an indoor wireless distributed communications system (WDCS) 100 that is configured to distribute communications services to remote coverage areas 102(1)(1)-102(M)(N), where 'N' is the number of remote coverage areas. The indoor WDCS 100 can be configured to support a variety of communications services that can include cellular communications services, wireless communications services, such as RF identification (RFID) tracking, WiFi, local area network (LAN), wireless LAN (WLAN), and wireless solutions (Bluetooth, WiFi Global Positioning System (GPS) signal-based, and others) for location-based services, and combinations thereof, as examples. For example, the indoor WDCS 100 may be a DAS or an RRH system. The remote coverage areas 102(1)(1)-102(M)(N) are created by and centered on remote units (RUs) 104(1)(1)-104(M)(N) connected to an indoor cell 106. The remote units 104(1)(1)-104(M)(N) are shown arranged in rows '1-M,' each with columns '1-N' for convenience, and are located in a building 108 or in an area of the building 108. The indoor cell 106 may be communicatively coupled to an outdoor cell 110, such as for example, a base transceiver station (BTS) or a baseband unit (BBU). The outdoor cell 110 is part of an outdoor communications system 111. The indoor cell 106 receives downlink communications signals 112D from either the outdoor cell 110 or other network to be communicated to the remote units 104(1)(1)-104(M)(N). As examples, the indoor cell 106 may be an RRH cell or a central unit as part of a DAS. The downlink communications signals 112D are communicated by the indoor cell 106 over a communications link 114 to the remote units 104(1)(1)-104(M)(N). The remote units 104(1)(1)-104(M)(N) are configured to receive the downlink communications signals 112D from the indoor cell 106 over the communications link 114. The remote units 104(1)(1)-104(M)(N) may include an RF transmitter/receiver (not shown) and a respective antenna operably connected to the RF transmitter/receiver to wirelessly distribute the communications services to indoor user equipment (UE) 116 within their respective remote coverage areas 102(1)(1)-102(M)(N). The remote units 104(1)(1)-104(M)(N) are also configured to receive uplink communications signals 112U from the UE 116 in their respective remote coverage areas 102(1)(1)-102(M)(N) to be communicated to the indoor cell 106. The outdoor cell 110 is also configured to exchange downlink and uplink communications signals 118D, 118U to outdoor UE 120.

With continuing reference to FIG. 1, both the indoor cell 106 and the outdoor cell 110 use the same channel frequency. If no coordination exists between the outdoor cell 110 and the indoor cell 106, downlink communications signals 118D transmitted by the outdoor cell 110 to the outdoor UE 120 might be received as interference by the indoor UE 116. This can occur for indoor UE 116 that is located close to the side of the building 108 and thereby exposed to the outdoor cell 110. In addition, downlink communications signals 112D communicated from the indoor cell 106 through the remote units 104(1)(1)-104(M)(N) to the indoor UE 116 might be received as interference by the outdoor UE 120 if located close enough to the building 108 within a remote coverage area 102(1)(1)-102(M)(N). This is called "inter-cell interference." Similar interference issues also exist for uplink communications signals 112U, 118U. To avoid collisions between the indoor and outdoor systems, Inter-Cell Interference Coordination (ICIC) is employed by the indoor cell 106 and the outdoor cell 110. ICIC is a self-organizing network (SON) feature used by neighboring cells for coordinating the usage of their time frequency resources for minimizing the occurrences where two cells assign the same radio resources simultaneously. ICIC provides a solution to inter-cell interference by applying restrictions to a radio resource matrix (RRM) managed by a cell, such as a base transceiver station (BTS), thus improving favorable channel conditions across subsets of UE that are severely impacted by the interference, and thus attaining high spectral efficiency. When ICIC is employed, the engaged cells temporarily give up part of their available time frequency resources in a way that each of the engaged cells uses a certain portion of the available time frequency resources and let the other cell use the other portion. In this manner, a collision between time frequency resources is avoided, but at the price of reduced time frequency resources available for each neighboring cell.

In this regard, with reference back to FIG. 1, employing ICIC in the indoor and outdoor cells 106, 110 causes radio resources in an RRM 122 (e.g., a radio frame) used by the outdoor cell 110 and the indoor cell 106 to be divided based on time division, frequency division, or both. In the example in FIG. 1, the indoor and outdoor cells 106, 110 divide the radio resources (e.g., radio sub-frames) between them based on time division. According to this example, the outdoor cell 110 uses radio resources 124 in the RRM 122 while the indoor cell 106 uses radio resources 126 in the RRM 122. As a result, collisions between the indoor WDCS 100 and the outdoor communications system 107 can be avoided. However, as a result, employing ICIC results in the indoor WDCS 100 only having a portion of the available radio resources of the RRM 122 available to support the indoor UE 116, although most of the area of the building 108 is not exposed to the outdoor cell 110 and thus not subject to potential interference from the outdoor cell 110.

No admission is made that any reference cited herein constitutes prior art. Applicant expressly reserves the right to challenge the accuracy and pertinency of any cited documents.

SUMMARY

Embodiments of the disclosure relate to automatic configuration of cell assignment of non-Inter-Cell Interference Coordination (ICIC)-engaged remote units in a wireless distribution communications system (WDCS) to non-ICIC-engaged WDCS cells to avoid or reduce dividing radio resources. For example, the WDCS may be an indoor WDCS that includes one or more indoor cells that are indoor mobile networks configured to distribute radio communication signals to remote units in remote coverage areas. Remote units serviced by WDCS cells (e.g., indoor cells) in the WDCS may also be located in close enough proximity to another neighboring cell to receive communications signals from the neighboring cell (e.g., an outdoor cell). For example, the neighboring cell may be an outdoor cell (e.g., a macro cell) that is located in communications range of some of the remote coverage areas provided by the remote units in the WDCS. Communications signals received by a remote unit in the WDCS from the neighboring cell may interfere with the reception of communications signals from a WDCS cell assigned to the remote unit. In this regard, the WDCS cells in the WDCS can be configured to engage in ICIC as "ICIC-engaged WDCS cells" with the neighboring cell to share radio resources and avoid signal collisions. This sharing of radio resources reduces the serving capacity of the ICIC-engaged WDCS cells. However, some of the remote units serviced by an ICIC-engaged WDCS cell may not be exposed to receiving communications signals from the neighboring cell, and thus are considered "non-ICIC-engaged remote units." Thus, the resources available to these remote units are also reduced as being serviced by an ICIC-engaged WDCS cell even though these remote units are not exposed to receiving interfering communications signals from a neighboring cell.

In this regard, in aspects disclosed herein, to minimize or avoid dividing of radio resources between remote units that are "non-ICIC-engaged remote units," the WDCS is configured to identify which remote units are "ICIC-engaged remote units." An ICIC-engaged remote unit is a remote unit serviced by an ICIC-engaged WDCS cell that is also exposed to receiving communications signals from the neighboring cell in ICIC relation with the ICIC-engaged WDCS cell. A non-ICIC-engaged remote unit is a remote unit serviced by an ICIC-engaged WDCS cell, but is not exposed to communications signals from the neighboring cell in ICIC relation with the ICIC-engaged WDCS cell. A cell assignment configuration circuit is configured to identify the ICIC-engaged WDCS cell(s) (i.e., in ICIC relation with a neighboring cell) among the WDCS cells in the WDCS, based on determining the WDCS cells assigned to the remote units that receive communications signals from a neighboring cell. The cell assignment configuration circuit is configured to determine a cell assignment configuration for the WDCS based on reassigning non-ICIC-engaged remote units assigned to the identified ICIC-engaged WDCS cells to a non-ICIC-engaged WDCS cells. A "non-ICIC-engaged WDCS cell" is a cell that is not assigned to remote units that can be exposed to receiving communications signals from the neighboring cell. The cell assignment configuration circuit is then configured to configure the cell assignment of the remote units in the WDCS based on the determined cell assignment configuration.

In this manner, the radio resources for servicing non-ICIC-engaged remote units are not divided as would be the case if the non-ICIC-engaged remote units retained their assignment to be serviced by an ICIC-engaged WDCS cell. Thus, the network capacity of both the WDCS and the neighboring cell may be increased since the divided radio resources are not required to be used to service non-ICIC-engaged remote units that are not exposed to communications signals from the neighboring cell. The division of radio resources may not be necessary to avoid or reduce interference between a neighboring cell and a remote unit that is not exposed to communications signals from the neighboring cell. The gained increased capacity can be considered in planning and designing of the WDCS to reduce cost while attaining the same net capacity, and of increasing capacity without increasing cost.

In one exemplary aspect, a cell assignment configuration circuit for a WDCS that includes at least two WDCS cells each configured to exchange communications signals with a plurality of remote units is provided. The cell assignment configuration circuit is configured to identify at least one remote unit among the plurality of remote units in the WDCS receiving downlink communications signals potentially transmitted by at least one neighboring cell to the WDCS. The cell assignment configuration circuit is also configured to identify at least one ICIC-engaged WDCS cell in the WDCS in ICIC with the at least one neighboring cell based on a WDCS cell in the WDCS assigned to the identified at least one remote unit receiving the downlink communications signals potentially transmitted by the at least one neighboring cell to the WDCS. The cell assignment configuration circuit is also configured to determine at least one non-ICIC-engaged remote unit assigned to the identified at least one ICIC-engaged WDCS cell not identified as receiving downlink communications signals transmitted by the at least one neighboring cell. The cell assignment configuration circuit is also configured to determine a cell assignment configuration for the WDCS based on reassigning the at least one non-ICIC-engaged remote unit to a non-ICIC-engaged WDCS cell. The cell assignment configuration circuit is also configured to configure a cell assignment of at least one remote unit in the WDCS based on the determined cell assignment configuration.

An additional embodiment of the disclosure relates to a method of configuring cell assignment of ICIC-engaged remote units in a WDCS. The method comprises identifying at least one remote unit in the WDCS receiving downlink communications signals potentially transmitted by at least one neighboring cell to the WDCS. The method also comprises identifying at least one ICIC-engaged WDCS cell in the WDCS in ICIC with the at least one neighboring cell based on WDCS cells in the WDCS assigned to the at least one identified remote unit receiving the downlink communications signals potentially transmitted by the at least one neighboring cell to the WDCS. The method also comprises determining at least one non-ICIC-engaged remote unit assigned to the identified at least one ICIC-engaged WDCS cell and not identified as receiving the downlink communications signals transmitted by the at least one neighboring cell. The method also comprises determining a cell assignment configuration for the WDCS based on reassigning the at least one non-ICIC-engaged remote unit to a non-ICIC-engaged WDCS cell. The method also comprises configuring a cell assignment of at least one remote unit in the WDCS based on the determined cell assignment configuration.

An additional embodiment of the disclosure relates to a WDCS. The WDCS comprises a plurality of WDCS cells each configured to communicate a downlink communications signal for a cell service to a client device and receive an uplink communications signal for the cell service from the client device. The WDCS also comprises a central unit configured to distribute the downlink communications signals from the plurality of WDCS cells over at least one downlink communications medium to a plurality of remote units. The central unit is also configured to distribute the uplink communications signals received from the plurality of remote units over at least one uplink communications medium to the plurality of WDCS cells. The plurality of remote units are each configured to receive at least one downlink communications signal over the at least one downlink communications medium from the central unit. The plurality of remote units are also each configured to distribute the received at least one downlink communications signal to at least one client device. The plurality of remote units are also each configured to receive at least one uplink communications signal from the at least one client device. The plurality of remote units are also each configured to distribute the received at least one uplink communications signal from the at least one client device over the at least one uplink communications medium to the central unit. The WDCS also comprises a cell assignment configuration circuit configured to identify at least one remote unit among the plurality of remote units receiving the downlink communications signals potentially transmitted by at least one neighboring cell to at least one WDCS cell among the plurality of WDCS cells. The cell assignment configuration circuit is also configured to identify at least one ICIC-engaged WDCS cell among the plurality of WDCS cells in ICIC with the at least one neighboring cell based on the plurality of WDCS cells in the WDCS assigned to the at least one remote unit identified as receiving the downlink communications signals potentially transmitted by the at least one neighboring cell to the WDCS. The cell assignment configuration circuit is also configured to determine at least one non-ICIC-engaged remote unit assigned to the identified at least one ICIC-engaged WDCS cell and not identified as receiving the downlink communications signals transmitted by the at least one neighboring cell. The cell assignment configuration circuit is also configured to determine a cell assignment configuration for the plurality of remote units based on reassigning the at least one non-ICIC-engaged remote unit to a non-ICIC engaged WDCS cell among the plurality of WDCS cells. The cell assignment configuration circuit is also configured to configure a cell assignment of at least one remote unit in the WDCS based on the determined cell assignment configuration.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Figure 1:
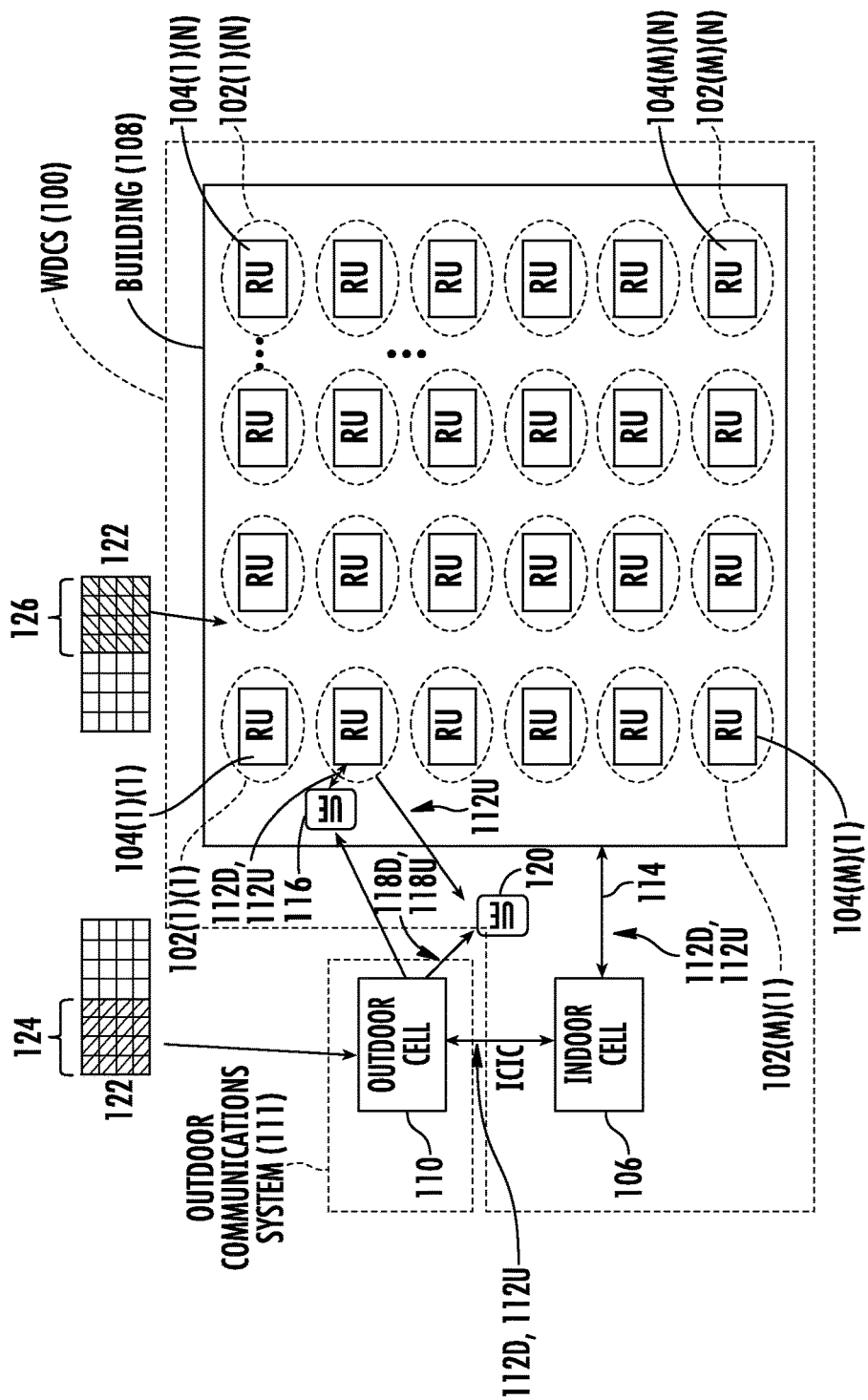
FIG. 1 is a schematic diagram of an exemplary indoor wireless distributed communications system (WDCS) that includes an indoor cell neighboring an outdoor cell.

Embodiments of the disclosure relate to automatic configuration of cell assignment of non-Inter-Cell Interference Coordination (ICIC)-engaged remote units in a wireless distribution communications system (WDCS) to non-ICIC-engaged WDCS cells to avoid or reduce dividing radio resources. For example, the WDCS may be an indoor WDCS that includes one or more indoor cells that are indoor mobile networks configured to distribute radio communication signals to remote units in remote coverage areas. Remote units serviced by WDCS cells (e.g., indoor cells) in the WDCS may also be located in close enough proximity to another neighboring cell to receive communications signals from the neighboring cell (e.g., an outdoor cell). For example, the neighboring cell may be an outdoor cell (e.g., a macro cell) that is located in communications range of some of the remote coverage areas provided by the remote units in the WDCS. Communications signals received by a remote unit in the WDCS from the neighboring cell may interfere with the reception of communications signals from a WDCS cell assigned to the remote unit. In this regard, the WDCS cells in the WDCS can be configured to engage in ICIC as "ICIC-engaged WDCS cells" with the neighboring cell to share radio resources and avoid signal collisions. This sharing of radio resources reduces the serving capacity of the ICIC-engaged WDCS cell. However, some of the remote units serviced by an ICIC-engaged WDCS cell may not be exposed to receiving communications signals from the neighboring cell, and thus are considered "non-ICIC-engaged remote units." Thus, the resources available to these remote units are also reduced as being serviced by an ICIC-engaged WDCS cell even though these remote units are not exposed to receiving interfering communications signals from a neighboring cell.

In this regard, in aspects disclosed herein, to minimize or avoid dividing of radio resources between remote units that are "non-ICIC-engaged remote units," the WDCS is configured to identify which remote units are "ICIC-engaged remote units." An ICIC-engaged remote unit is a remote unit serviced by an ICIC-engaged WDCS cell that is also exposed to receiving communications signals from the neighboring cell in ICIC relation with the ICIC-engaged WDCS cell. A non-ICIC-engaged remote unit is a remote unit serviced by an ICIC-engaged WDCS cell, but is not exposed to communications signals from the neighboring cell in ICIC relation with the ICIC-engaged WDCS cell. A cell assignment configuration circuit is configured to identify the ICIC-engaged WDCS cell(s) (i.e., in ICIC relation with a neighboring cell) among the WDCS cells in the WDCS, based on determining the WDCS cells assigned to the remote units that receive communications signals from a neighboring cell. The cell assignment configuration circuit is configured to determine a cell assignment configuration for the WDCS based on reassigning non-ICIC-engaged remote units assigned to the identified ICIC-engaged WDCS cells to a non-ICIC-engaged WDCS cells. A "non-ICIC-engaged WDCS cell" is a cell that is not assigned to remote units that can be exposed to receiving communications signals from the neighboring cell. The cell assignment configuration circuit is then configured to configure the cell assignment of the remote units in the WDCS based on the determined cell assignment configuration.

In this manner, the radio resources for servicing non-ICIC-engaged remote units are not divided as would be the case if the non-ICIC-engaged remote units retained their assignment to be serviced by an ICIC-engaged WDCS cell. Thus, the network capacity of both the WDCS and the neighboring cell may be increased since the divided radio resources are not required to be used to service non-ICIC-engaged remote units that are not exposed to communications signals from the neighboring cell. The division of radio resources may not be necessary to avoid or reduce interference between a neighboring cell and a remote unit that is not exposed to communications signals from the neighboring cell. The gained increased capacity can be considered in planning and designing of the WDCS to reduce cost while attaining the same net capacity, and of increasing capacity without increasing cost.

Figure 2:
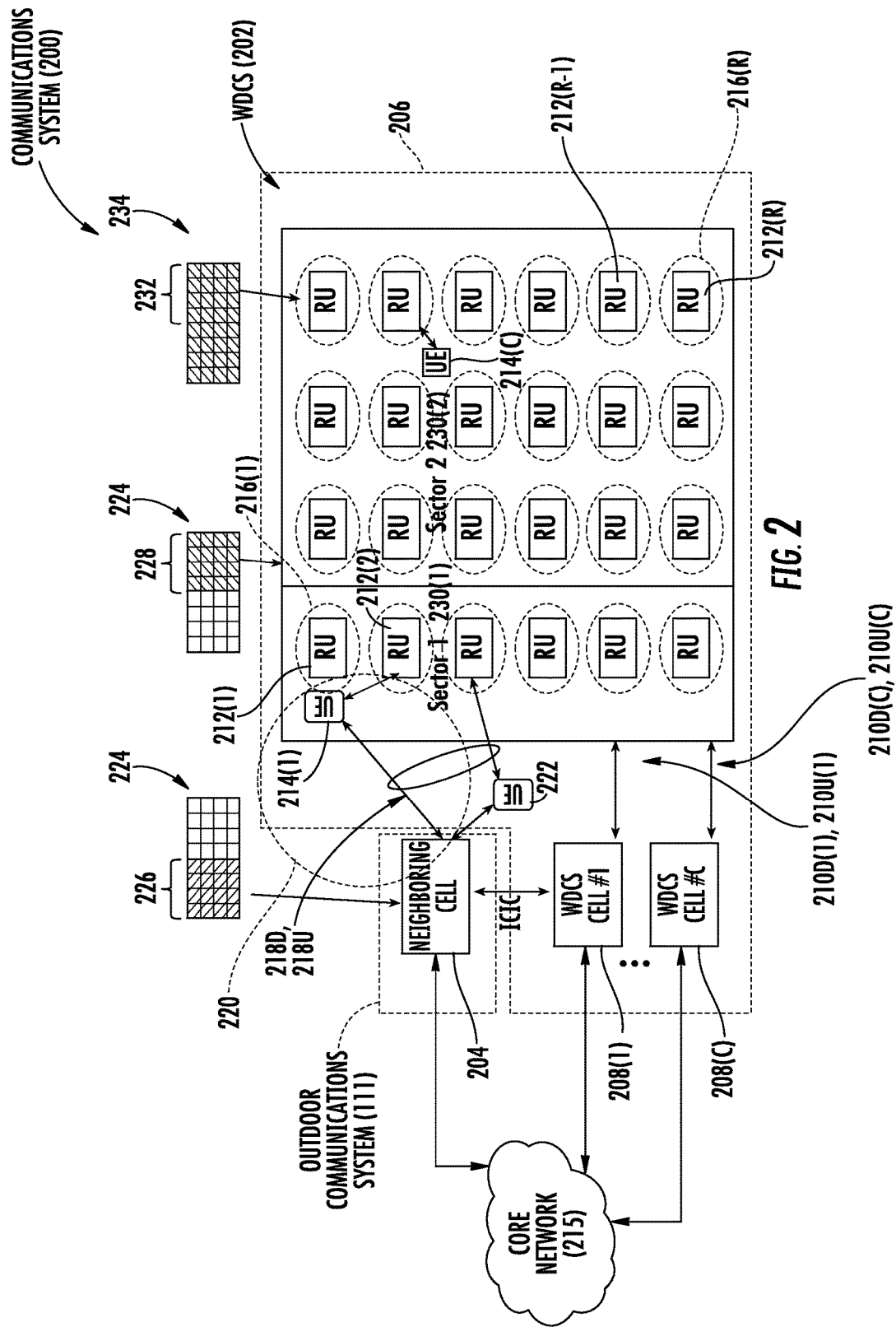
FIG. 2 is a schematic diagram of an exemplary communications system that includes a WDCS and a neighboring outdoor cell, wherein the WDCS is configured to automatically configure cell assignment of non-Inter-Cell Interference Coordination (non-ICIC)-engaged remote units assigned to ICIC-engaged WDCS cells, to non-ICIC-engaged WDCS cells.

In this regard, FIG. 2 is a schematic diagram of an exemplary communications system 200 that includes a WDCS 202 and a neighboring cell 204. The WDCS 202 may be located in an indoor environment, such as a building 206. The WDCS 202 includes one or more WDCS cells 208(1)-208(C) that are configured to distribute downlink communications signals 210D(1)-210D(N) to one or more remote units 212(1)-212(R). For example, if the WDCS 202 is distributed antenna system (DAS), the WDCS cells 208(1)-208(C) may be cellular base transceiver stations (BTSs) and/or baseband units (BBUs). The remote units 212(1)-212(R) may be remote antenna units that include antennas, wherein the remote units 212(1)-212(R) that are configured to wirelessly radiate received downlink communications signals 210D(1)-210D(C) received from one or more of the WDCS cells 208(1)-208(C) based on data received from a core network 215 over their respective antennas to user equipment (UE) 214(1)-214(C) in communication range of the remote units 212(1)-212(R). Each remote unit 212(1)-212(R) has a remote coverage area 216(1)-216(N) according to its transmission capability. For example, the UE 214(1)-214(C) may be a cellular telephone or other electronic device that is capable of wireless communications. The remote units 212(1)-212(R) are also configured to distribute (e.g., couple) uplink communications signals 210U(1)-210U(R) received from the UE 214(1)-214(C) to the WDCS cells 208(1)-208(C), which can then be distributed (e.g., coupled) to the core network 215.

With continuing reference to FIG. 2, the one or more WDCS cells 208(1)-208(C) could also be other types of cellular equipment. For example, the WDCS cells 208(1)-208(C) could be a remote radio head (RRH) system where the remote units 212(1)-212(R) are RRHs. An RRH is a remote radio transceiver that connects to an operation radio control panel. The WDCS cells 208(1)-208(C) may be radio heads that provide an interface to the core network 215. As another example, the WDCS cells 208(1)-208(C) could be a remote small cell system where the remote units 212(1)-212(R) are small cell. A small cell, also sometimes referred to as a "microcell," is a low-powered cellular radio access node that operates in licensed and/or unlicensed spectrums that may have a communications range of 10 meters to a few kilometers for example. Thus in this example, the WDCS cells 208(1)-208(C) may be a service node or other node that aggregates communications to and from the small cell remote units 212(1)-212(R) and the core network 215. In alternative examples, the WDCS cells 208(1)-208(C) may be actual BTSs (i.e., eNodeBs) cells.

With continuing reference to FIG. 2, the neighboring cell 204 in this example is a neighboring cell 204 that is located outdoors from the building 206 and is located in proximity to the WDCS 202. The neighboring cell 204 may be a macro cell that provides radio coverage serviced by a high power cell site, such as a tower, antenna, or mast. For example, the neighboring cell 204 may be a cellular BTS. The neighboring cell 204 is configured to distribute downlink communication signals 218D in a coverage area 220 to UE 222 and to receive uplink communications signals 218U from the UE 222 in the coverage area 220. As shown in FIG. 2, the neighboring cell 204 may be located close enough to certain remote units 212(1)-212(R) in the WDCS 202 such that the UE 214(1) in the WDCS 202 receives both the downlink communications signals 218D from the neighboring cell 204 and the downlink communications signals 210D(1) from the WDCS cell 208(1) via the remote unit 212(2) in the WDCS 202. In this example, the remote unit 212(2) is assigned in the WDCS 202 to be serviced by WDCS cell 208(1). The UE 214(1) receiving both the downlink communications signals 218D from the neighboring cell 204 and the downlink communications signals 210D(1) from the WDCS cell 208(1) could result in communication signal collisions unless an interference reduction or avoidance technique is employed. In this regard, the WDCS cell 208(1) is configured to engage in ICIC with the neighboring cell 204, as shown in FIG. 2.

ICIC is a self-organizing network (SON) feature that can be used by the neighboring cell 204 and the WDCS 202 for coordinating the usage of their time frequency resources for minimizing the occurrences where the neighboring cell 204 and the WDCS cell 208(1) (in this example) use the same radio resources simultaneously. In this example, the neighboring cell 204 and the WDCS cell 208(1) use the same radio resource matrix (RRM) 224. For example, the RRM 224 may be a communications frame according to the communications protocol employed, such as a Long Term Evolution (LTE) frame as a non-limiting example. As shown in FIG. 2, in this example, the WDCS cell 208(1) and the neighboring cell 204 can divide the radio resources (e.g., radio sub-frames) of the RRM 224 between them based on time division. As another example, the WDCS cell 208(1) and the neighboring cell 204 could also divide the radio resources (e.g., radio sub-frames) of the RRM 224 in other manners, such as frequency division or both time and frequency division. According to this example, the neighboring cell 204 uses radio resources 226 in the RRM 224 while WDCS cell 208(1) uses radio resources 228 in the RRM 224. In this manner, the UE 214(1) serviced by the remote unit 212(2), which is serviced by the WDCS cell 208(1), is potentially interfered with by the neighboring cell 204. Thus the WDCS cell 208(1) may engage in ICIC relations (i.e., be "ICIC-engaged") with the neighboring cell 204 to reduce or avoid interference between the UE 214(1) and the neighboring cell 204. The remote unit 212(2) in FIG. 2 can be thought of as an "ICIC-engaged remote unit," as being serviced by the ICIC-engaged WDCS cell 208(1) and being located close enough to the neighboring cell 204 to also receive downlink communications signals 218D from the neighboring cell 204. As a result of the WDCS cell 208(1) and the neighboring cell 204 being ICIC-engaged, collisions between the WDCS cell 208(1) and the neighboring cell 204 can be avoided. However, as a result, employing ICIC for the WDCS cell 208(1) to be ICIC-engaged with the neighboring cell 204 results in the WDCS cell 208(1) only having a portion of the available radio resources 228 of the RRM 224 available to support the UE 214(1) shown. However, most of the area of the building 206, and thus most of the remote units 212(1)-212(R) distributed therein, are not exposed to the coverage area 220 of the neighboring cell 204 and thus not subject to potential interference from the neighboring cell 204. For example, remote unit 212(R) in the WDCS 202 in FIG. 2 is not within the coverage area 220 of the neighboring cell 204.

In this regard, as will be discussed in more detail below and by examples, to minimize or avoid dividing of radio resources 226, 228 of the RRM 224 between all the remote units 212(1)-212(R) in the WDCS 202 with the neighboring cell 204 when the WDCS 202 is engaged in ICIC with the neighboring cell 204, the WDCS 202 in FIG. 2 is configured to automatically configure and/or reconfigure cell assignment of non-ICIC-engaged remote units 212(1)-212(R) in the WDCS 202. Non-ICIC-engaged remote units 212(1)-212(R) are remote units that are serviced by an ICIC-engaged WDCS cell 208(1)-208(C), but do not receive downlink communications signals 218D transmitted by the neighboring cell 204 sufficient to potentially or actually interfere with downlink communications signals 210D(1)-210D(C) received from its respective assigned WDCS cell 208(1)-208(C). On the other hand, an ICIC-engaged remote unit 212(1)-212(R) is a remote unit that is serviced by an ICIC-engaged WDCS cell 208(1)-208(C), but can receive downlink communications signals 218D transmitted by the neighboring cell 204 sufficient to potentially or actually interfere with downlink communications signals 210D(1)-210D(C) received from its respective assigned WDCS cell 208(1)-208(C). The WDCS 202 is configured to identify which of its remote units 212(1)-212(R) are receiving the downlink communications signals 218D transmitted by the neighboring cell 204, thus potentially being an ICIC-engaged remote unit 212(1)-212(R). The WDCS 202 is also configured to identify the ICIC-engaged WDCS cell(s) 208(1)-208(C) in the WDCS 202 engaged in ICIC with the neighboring cell 204 based on the WDCS cells 208(1)-208(C) in the WDCS 202 assigned to the ICIC-engaged remote unit 212(1)-212(R). The WDCS 202 is then configured to determine the non-ICIC-engaged remote units among the remote units 212(1)-212(R) assigned to the identified ICIC-engaged WDCS cell(s) 208(1)-208(C) and not identified as receiving the downlink communications signals 218D transmitted by the neighboring cell 204. The WDCS 202 is configured to determine a cell assignment configuration to provide for the non-ICIC-engaged remote units 212(1)-212(R) to be assigned to be serviced by a different non-ICIC-engaged WDCS cell(s) 208(1)-208(C) that is not engaged in ICIC with the neighboring cell 204. These non-ICIC-engaged WDCS cell(s) 208(C)-208(C) would be different cells than WDCS cell 208(1) in this example, since WDCS cell 208(1) is an ICIC-engaged WDCS cell engaged in ICIC with the neighboring cell 204. The WDCS 202 can then configure or re-configure cell assignment of the remote units 212(1)-212(R) based on the determined cell assignment configuration. For example, remote units 212(1)-212(R) in the WDCS 202 that were identified as being exposed to the neighboring cell 204 can be assigned to a dedicated ICIC-engaged WDCS cell(s) 208(1)-208(C) engaged in ICIC with the neighboring cell 204. The other remote units 212(1)-212(R) in the WDCS 202 that are not exposed to the neighboring cell 204 and identified as not being exposed to the neighboring cell 204 can be assigned to a dedicated non-ICIC-engaged WDCS cell(s) 208(1)-208(C) not engaged in ICIC with the neighboring cell 204.

In this manner, as shown in FIG. 2, the radio resources 226, 228 of the RRM 224 assigned to the ICIC-engaged WDCS cell 208(1) to service the remote units 212(1)-212(R) may not be divided with the radio resources 226, 228 of the RRM 224 of the non-ICIC-engaged WDCS cells 208(2)-208(C) used to service non-ICIC-engaged remote units 212(1)-212(R). This is shown by example in FIG. 2, where the remote units 212(1)-212(R) are split between sector 1 230(1) and sector 2 230(2). In this regard, the WDCS 202 has assigned certain ICIC-engaged remote units 212(1)-212(R) to be serviced by ICIC-engaged WDCS cell 208(1) for sector 1 230(1). The WDCS 202 has assigned other non-ICIC-engaged remote units 212(1)-212(R) to be serviced by non-ICIC-engaged WDCS cell 208(2) for sector 2 230(2). Thus, the ICIC-engaged WDCS cell 208(1) engaged in ICIC with the neighboring cell 204 shares the radio resources 226, 228 of the RRM 224 with the neighboring cell 204, but such radio resources 226, 228 are only split between ICIC-engaged remote units 212(1)-212(R) in sector 1 230(1). These radio resources 226, 228 do not have to be split among non-ICIC-engaged remote units 212(1)-212(R). The non-ICIC-engaged remote units 212(1)-212(R) in sector 2 230(2) enjoy the full radio resources 226, 228 of the RRM 224 supported by WDCS cell 208(C) without being divided with the neighboring cell 204.

In this manner, with reference to the example in FIG. 2, radio resources 232 of RRM 234 of the non-ICIC-engaged WDCS cell 208(C) assigned to the non-ICIC-engaged remote units 212(1)-212(N) in sector 2 230(2) may not be divided with the radio resources 226, 228 of the WDCS cell 208(C) servicing remote units 212(1)-212(R) in sector 1 230(1) engaged in ICIC. Thus, the network capacity of both the WDCS 202 and the neighboring cell 204 may be increased since the dividing of radio resources 226, 228 between remote units 212(1)-212(R) in sector 2 230(2) not engaged in ICIC with the neighboring cell 204 is minimized or avoided. This is because such division of radio resources 226, 228 may not be necessary to avoid or reduce interference between such remote units 212(1)-212(R) in sector 2 230(2) not assigned to the non-ICIC-engaged WDCS cell 208(C). The gained increased capacity can be considered in planning and designing of the WDCS 202 to reduce cost while attaining the same net capacity, and of increasing capacity without increasing cost.

Note that if a non-ICIC-engaged remote unit 212(1)-212(R) is reassigned to a non-ICIC-engaged WDCS cell 208(1)-208(C) in the WDCS 200 in FIG. 2, the reassigned non-ICIC-engaged WDCS cell 208(1)-208(C) may be an existing WDCS cell 208(1)-208(C) in the WDCS 200 or may be an added WDCS cell 208(1)-208(C) installed in WDCS 200.

Figure 3:
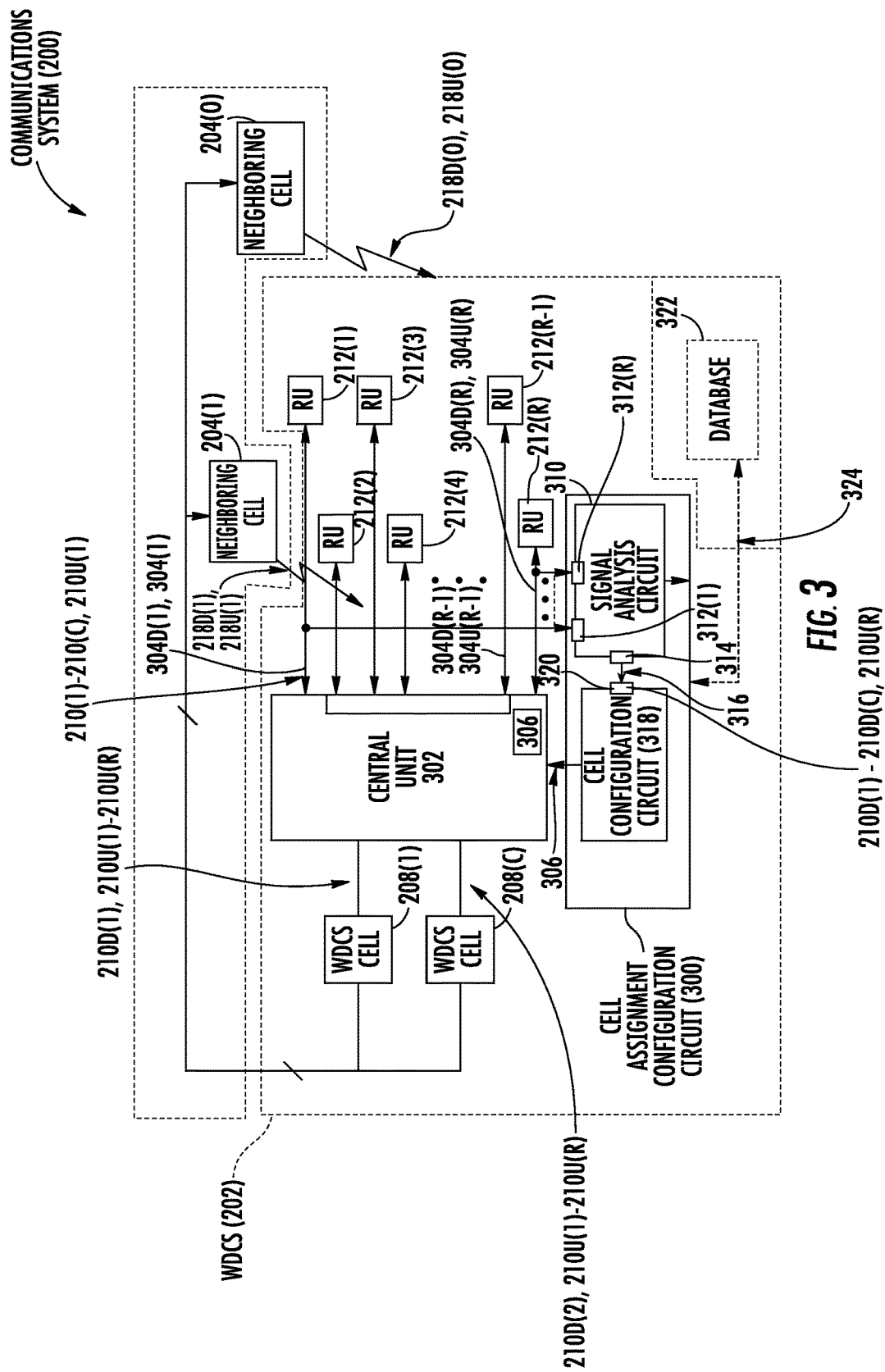
FIG. 3 is a schematic diagram of an exemplary WDCS that includes a cell assignment configuration circuit configured to automatically configure cell assignment of non-ICIC-engaged remote units to non-ICIC-engaged WDCS cells.

FIG. 3 is a schematic diagram of the WDCS 202 in FIG. 2 that includes a cell assignment configuration circuit 300 configured to automatically configure cell assignment of remote units 212(1)-212(R) in the WDCS 202. The cell assignment is based on identifying remote units 212(1)-212(R) assigned to an ICIC-engaged WDCS cell 208(1)-208(C) and not exposed to the downlink communications signals 218D from the neighboring cell 204 (i.e., non-ICIC-engaged remote units) from the remote units 212(1)-212(R) assigned to an ICIC-engaged WDCS cell 208(1)-208(C) and exposed to the downlink communications signals 218D from the neighboring cell 204 (i.e., ICIC-engaged remote units). Common components between the WDCS 202 illustrated in FIG. 2 and the WDCS 202 illustrated in FIG. 3 are shown with common element numbers and thus will not be re-described. The non-ICIC-engaged remote units 212(1)-212(R) are assigned and/or re-assigned to a non-ICIC-engaged WDCS cell 208(1)-208(C).

As shown in FIG. 3, the WDCS 202 includes a central unit 302. The central unit 302 includes circuits for distributing the downlink communications signals 218D(1)-218D(O) from the WDCS cells 208(1)-208(C) over downlink communications media 304D(1)-304D(R) to the remote units 212(1)-212(R). In this example, the WDCS 202 is organized a point-to-multi-point architecture where a dedicated downlink communications media 304D(1)-304D(R) is provided between the central unit 302 and a respective remote unit 212(1)-212(R). However, the WDCS 202 could be organized in any other architecture, including but not limited to a daisy-chain architecture where the remote units 212(1)-212(R) are communicatively daisy-chained to each other. Also, a single downlink communications media could also be employed with multiplexing, such as time-division multiplexing (TDM), frequency-division multiplexing (FDM), and/or wave-division multiplexing (WDM). The central unit 302 is also configured to receive and distribute the uplink communications signals 210U(1)-210U(R) from the remote units 212(1)-212(R) over uplink communications media 304U(1)-304U(R) to the WDCS cells 208(1)-208(C).

With continuing reference to FIG. 3, the remote units 212(1)-212(R) are each configured to receive one or more downlink communications signals 210D(1)-210D(C) over a respective downlink communications medium 304D(1)-304D(R) from the central unit 302. The central unit 302 is configured to route the downlink communications signal 210D(1)-210D(C) based on a cell assignment configuration 306. The cell assignment configuration 306 provides a mapping of which downlink communications medium 304D(1)-304D(R) gets distributed to which remote units 212(1)-212(R). The cell assignment configuration 306 may be stored in a memory and accessible by circuits in the central unit 302. For example, the cell assignment configuration 306 may provide for a remote unit 212(1)-212(R) to receive all downlink communications signals 210D(1)-210D(C) from all WDCS cells 208(1)-208(C), or a subset of downlink communications signals 210D(1)-210D(C) from only certain WDCS cells 208(1)-208(C). The central unit 302 may include a router circuit 308 that is configured to route downlink communications signals 210D(1)-210D(C) from the WDCS cells 208(1)-208(C) assigned to the remote units 212(1)-212(R) in the cell assignment configuration 306, to such remote units 212(1)-212(R). The central unit 302 is also configured to receive one or more uplink communications signals 210U(1)-210U(R) from the remote unit 212(1)-212(R) over the uplink communications media 304U(1)-304U(R). The uplink communications signals 210U(1)-210U(R) are uplink communications signals received by the remote unit 212(1)-212(R) from client devices or processed signals based on the uplink communications signals 210U(1)-210U(R) received by the remote unit 212(1)-212(R).

With continuing reference to FIG. 3, the WDCS 202 also includes the cell assignment configuration circuit 300 configured to automatically configure cell assignment of remote units 212(1)-212(R) in the WDCS 202 assigned to ICIC-engaged WDCS cells 208(1)-208(C) engaged in ICIC with the neighboring cells 204(1)-204(O) from the non-ICIC-engaged remote units 212(1)-212(R) in the WDCS 202 not assigned to ICIC-engaged WDCS cells 208(1)-208(C). The cell assignment configuration circuit 300 in this example includes a signal analysis circuit 310. The signal analysis circuit 310 is configured to receive, on signal analysis inputs 312(1)-312(R) downlink communications signals 210D(1)-210D(N) communicated to the remote units 212(1)-212(R). In this example, the signal analysis inputs 312(1)-312(R) are communicatively coupled to the downlink communications media 304D(1)-304D(R). The signal analysis circuit 310 is configured to identify the remote units 212(1)-212(R) in the WDCS 202 receiving the downlink communications signals 218D(1)-218D(O) transmitted by at least one neighboring cell 204(1)-204(O) as an ICIC-engaged remote unit 212(1)-212(R). The signal analysis circuit 310 is configured to communicate on a signal analysis output 314, a neighboring cell indicator 316 indicating the remote unit 212(1)-212(R) identified as receiving the downlink communications signals 218D(1)-218D(O) transmitted by at least one neighboring cell 204(1)-204(O).

Alternatively, each remote unit 212(1)-212(R) could include a signal analysis circuit similar to the signal analysis circuit 310 to analyze the downlink communications signal 210D(1)-210D(N) communicated to its respective remote units 212(1)-212(R), and identify if its respective remote unit 212(1)-212(R) is receiving a downlink communications signal 218D(1)-218D(O) transmitted by at least one neighboring cell 204(1)-204(O) as an ICIC-engaged remote unit 212(1)-212(R). The signal analysis circuit 310 in each remote unit 212(1)-212(R) could then be configured to communicate a neighboring cell indicator 316 to the cell assignment configuration circuit 300 indicating if its respective remote unit 212(1)-212(R) was identified as receiving the downlink communications signals 218D(1)-218D(O) transmitted by at least one neighboring cell 204(1)-204(O).

With continuing reference to FIG. 3, the cell assignment configuration circuit 300 in this example also includes a cell configuration circuit 318. The cell configuration circuit 318 is configured to receive the neighboring cell indicator 316 on a cell configuration input 320 communicatively coupled to the signal analysis output 314. The cell configuration circuit 318 is also configured identify any ICIC-engaged WDCS cells 208(1)-208(C) in the WDCS 202 in ICIC with a neighboring cell 204(1)-204(O) based on the WDCS cells 208(1)-208(C) in the WDCS 202 assigned to ICIC-engaged remote units 212(1)-212(R) (i.e., exposed to downlink communication signals 218D(1)-218D(O) from the neighboring cell 204) indicated in the neighboring cell indicator 316. The cell configuration circuit 318 is configured to determine if any remote units 212(1)-212(R) assigned to the identified ICIC-engaged WDCS cells 208(1)-208(C) were not identified as receiving the downlink communications signals 218D(1)-218D(O) transmitted by the neighboring cells 204(1)-204(O) (i.e., non-ICIC-engaged remote units), based on the neighboring cell indicator 316. The cell configuration circuit 318 is configured to determine the cell assignment configuration 306 for the WDCS 202 based on reassigning non-ICIC-engaged remote units 212(1)-212(R) in the WDCS 202 currently assigned to an ICIC-engaged WDCS cell 208(1)-208(C), to a non-ICIC-engaged WDCS cell 208(1)-208(C). The cell configuration circuit 318 is then configured to configure or re-configure the cell assignment of one or more non-ICIC-engaged remote units 212(1)-212(R) in the WDCS 202 based on the determined cell assignment configuration 306. As previously discussed above, the cell assignment configuration 306 determines which downlink communications signals 218D(1)-218D(C) from the WDCS cell 208(1)-208(C) are routed by the router circuit 308 to the remote units 212(1)-212(R). The cell configuration circuit 318 communicates a new cell assignment configuration 306 to the central unit 302 to then control the router circuit 308 to direct the downlink and uplink communications signals 210D(1)-210D(C), 210U(1)-210U(R) to and from the remote units 212(1)-212(R) as assigned to the WDCS cells 208(1)-208(C). Thus, using the example of FIG. 2, remote units 212(1)-212(R) in sector 2 230(2) that were receiving downlink communications signals 218D(1)-218D(O) from the neighboring cells 204(1)-204(O) were determined by the cell configuration circuit 318 to be assigned to the identified ICIC-engaged WDCS cells 208(1)-208(C). The cell configuration circuit 318 then determined the cell assignment configuration 306 for the WDCS 202 based on reassigning remote units 212(1)-212(R) not receiving downlink communications signals 218D(1)-218D(O) from the neighboring cells 204(1)-204(O) that are currently assigned to a determined ICIC-engaged WDCS cell 208(1), to a non-ICIC-engaged WDCS cell 208(2). The cell configuration circuit 318 then configured or re-configure the cell assignment of one or more non-ICIC-engaged remote units 212(1)-212(R) in the WDCS 202 to be serviced by the WDCS cell 208(2) in sector 2 230(2) on the determined cell assignment configuration 306.

With reference back to FIG. 3, the cell assignment configuration circuit 300 may also have access to an optional database 322 to obtain information 324 about the location of the remote units 212(1)-212(R) and/or the neighboring cells 204(1)-204(O) to determine which remote units 212(1)-212(R) in the WDCS 202 are likely exposed to a neighboring cell 204(1)-204(O) and which remote units 212(1)-212(R) are not likely exposed to a neighboring cell 204(1)-204(O). This information can be used by the cell configuration circuit 318 to determine a cell assignment of connectivity of an ICIC-engaged remote unit 212(1)-212(R) to another non-ICIC-engaged WDCS cell 208(1)-208(C) that is not engaged in ICIC with a neighboring cell 204(1)-204(O).

Figure 4:
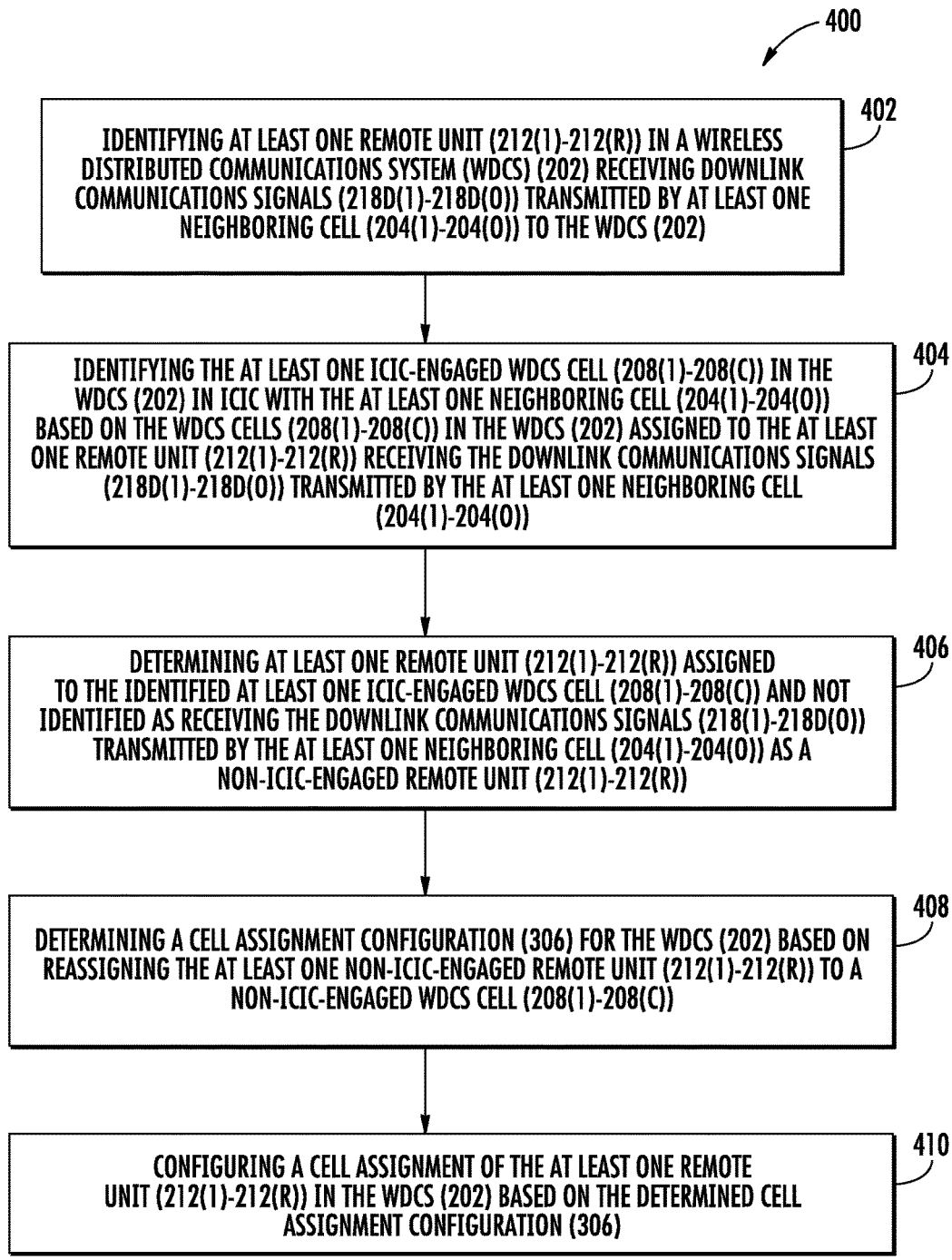
FIG. 4 is a flowchart illustrating an exemplary process of the cell assignment configuration circuit in the WDCS of FIG. 3 automatically configuring cell assignment of non-ICIC-engaged remote units assigned to ICIC-engaged WDCS cells, to non-ICIC-engaged WDCS cells.

FIG. 4 is a flowchart illustrating an exemplary process 400 of the cell assignment configuration circuit 300 in the WDCS 202 of FIG. 3 automatically configuring cell assignment of remote units 212(1)-212(R) in the WDCS 202 assigned to an ICIC-engaged WDCS cell 208(1)-208(C), from non-ICIC-engaged remote units 212(1)-212(R) in the WDCS 202 assigned to an ICIC-engaged WDCS cell 208(1)-208(C). In this regard, the cell assignment configuration circuit 300 identifies at least one remote unit 212(1)-212(R) in the WDCS 202 receiving the downlink communications signals 218D(1)-218D(O) potentially transmitted by at least one neighboring cell 204(1)-204(O) to the WDCS 202 (block 402). As discussed in examples below, the downlink communications signals 218D(1)-218D(O) received by a remote unit 212(1)-212(R) may be from a neighboring cell 204(1)-204(O). The cell configuration circuit assignment 300 is configured to use the identification of these remote units 212(1)-212(R) receiving downlink communications signals 218D(1)-218D(O) potentially transmitted from a neighboring cell 204(1)-204(O) to identify ICIC-engaged WDCS cells 208(1)-208(C). The cell assignment configuration circuit 300 identifies the at least one ICIC-engaged WDCS cell 208(1)-208(C) in the WDCS 202 in ICIC with the at least one neighboring cell 204(1)-204(O) based on the WDCS cells 208(1)-208(C) in the WDCS 202 assigned to the remote unit 212(1)-212(R) receiving the downlink communications signals 218D(1)-218D(O) potentially transmitted by at least one neighboring cell 204(1)-204(O) (block 404). The cell assignment configuration circuit 300 determines at least one remote unit 212(1)-212(R) assigned to the identified at least one ICIC-engaged WDCS cell 208(1)-208 (C) and not identified as receiving the downlink communications signals 218D(1)-218D(O) transmitted by the at least one neighboring cell 204(1)-204(O) as a non-ICIC-engaged remote unit 212(1)-212(R) (block 406). The cell assignment configuration circuit 300 determines a cell assignment configuration 306 for the WDCS 202 based on reassigning the at least one identified non-ICIC-engaged remote unit 212 (1)-212(R) to a WDCS cell 208(1)-208(C) that is not an identified ICIC-engaged WDCS cell 208(1)-208(C) (block 408). The cell assignment configuration circuit 300 configures the cell assignment of the at least remote unit 212(1)-212(R) in the WDCS 202 based on the determined cell assignment configuration 306 (block 410). The configured cell assignment can include an identified non-ICIC-engaged remote unit(s) 212(1)-212(R).

Figure 5:
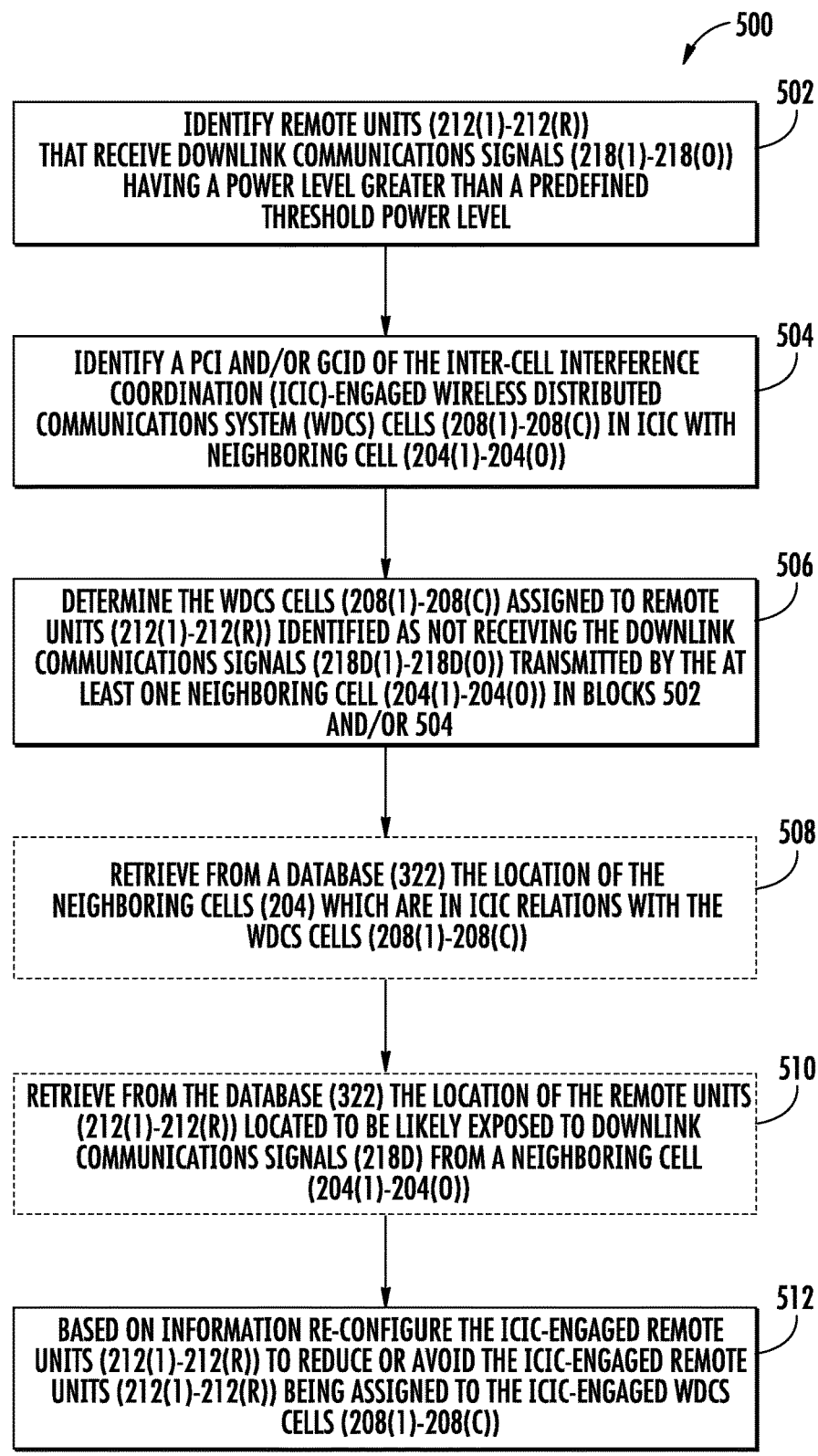
FIG. 5 is a flowchart illustrating another exemplary process of the cell assignment configuration circuit in the WDCS of FIG. 3 automatically configuring cell assignment of non-ICIC-engaged remote units assigned to ICIC-engaged WDCS cells, to non-ICIC-engaged WDCS cells.

FIG. 5 is a flowchart illustrating another exemplary process 500 of the cell assignment configuration circuit 300 in the WDCS 202 of FIG. 3 automatically configuring cell assignment of remote units 212(1)-212(R) in the WDCS 202 assigned to an ICIC-engaged WDCS cell 208(1)-208(C), from non-ICIC-engaged remote units 212(1)-212(R) in the WDCS 202 assigned to an ICIC-engaged WDCS cell 208 (1)-208(C). In this regard, the signal analysis circuit 310 in the cell assignment configuration circuit 300 identifies remote units 212(1)-212(R) in the WDCS 202 receiving the downlink communications signals 218D(1)-218D(O) having a power level higher than a predefined threshold power level (block 502). The signal analysis circuit 310 is configured to identify the at least one ICIC-engaged WDCS cell 208(1)-208(C) in the WDCS 202 in ICIC, by being configured to identify a global cell identification (ID) (GCID) and/or a physical cell identification (ID) (PCI) of the at least one ICIC-engaged WDCS cells 208(1)-208(C) in the WDCS 202 in ICIC with the neighboring cell 204 based on the WDCS cells 208(1)-208(C) in the WDCS 202 assigned to the at least one ICIC-engaged remote unit 212(1)-212(R) (block 504). The cell assignment configuration circuit 300 determines the WDCS cells 208(1)-208(C) assigned to remote units 212(1)-212(R) identified as not receiving the downlink communications signals 218D(1)-218D(O) transmitted by the at least one neighboring cell 204(1)-204(O) in blocks 502 and/or 504 (block 506). The cell configuration circuit 318 can also retrieve from the database 322 shown in the communications system 200 in FIG. 3, the location of the neighboring cell(s) 204 that is located in proximity to a WDCS cell 208(1)-208(C) more likely to be engaged in ICIC relations with a neighboring cell 204(1)-204(O) (block 508). The cell configuration circuit 318 could also retrieve from the database 322, information about whether remote units 212(1)-212(R) are located in proximity to a neighboring cell 204(1)-204(O) to be more likely to receive downlink communication signals 218D signals from a neighboring cell 204 (block 510). This information in the database 322 may be configured based on data obtained during installation of the WDCS 202. This information retrieved in steps 508 and/or 510 from the database 322 may further assist the cell configuration circuit 318 in determining which remote units 212(1)-212(R) are ICIC-engaged with a higher degree of accuracy rather than only relying on identifying remote units 212(1)-212(R) that receive downlink communications signals 218(1)-218(O) from a neighboring cell 204(1)-204(O). Using some or any of the information discussed above to determine remote units 212(1)-212(R) that are ICIC-engaged, the cell assignment configuration 306 can be reconfigured by the cell configuration circuit 318 to reduce or avoid the identified ICIC-engaged remote units 212(1)-212 (R) being assigned the ICIC-engaged WDCS cells 208(1)-208(C) (block 512).

Figure 6A:
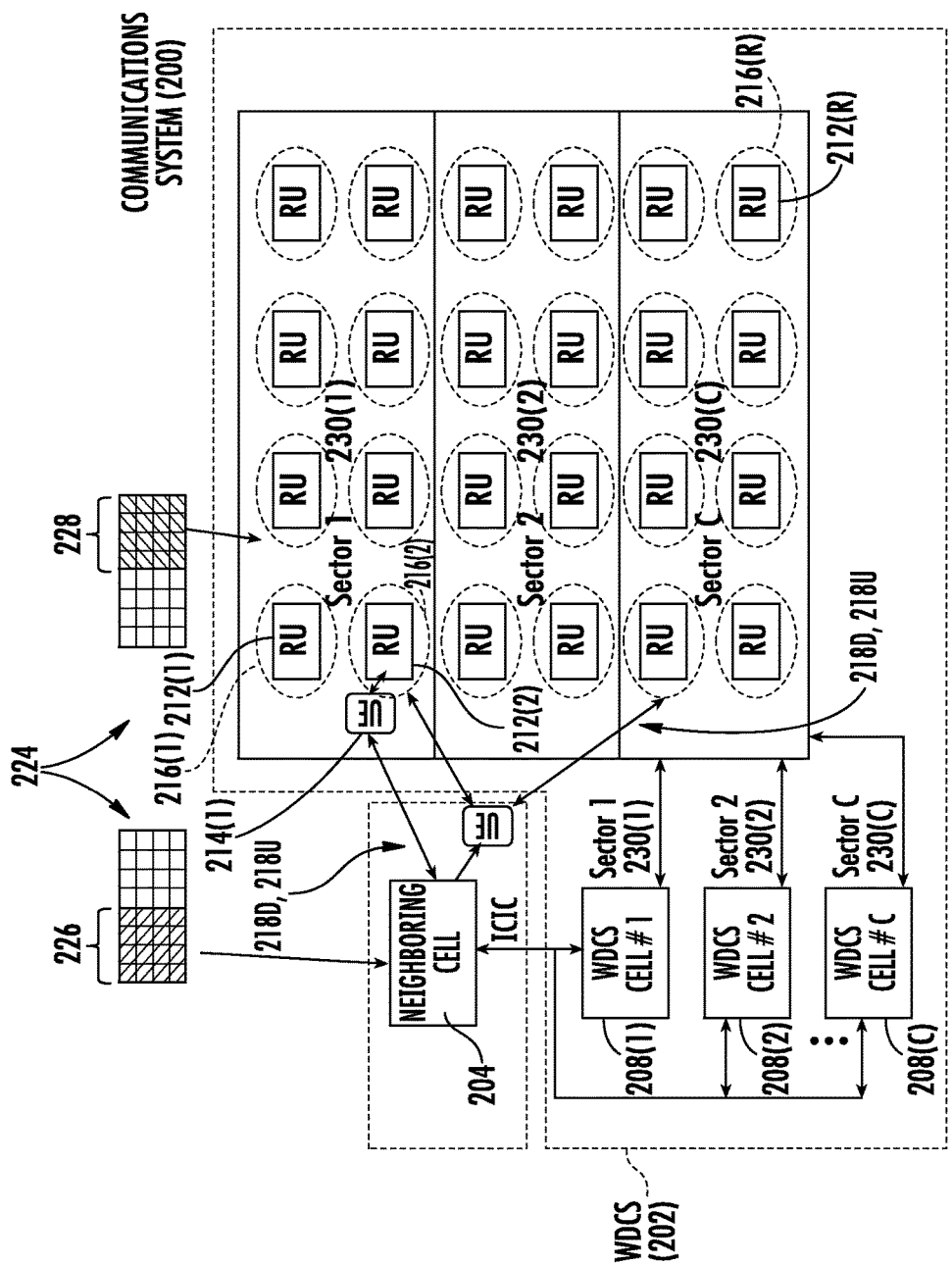
FIGS. 6A and 6B are schematic diagrams of the communications system of FIG. 2 that include examples of the WDCS configuring cell assignment of non-ICIC-engaged remote units assigned to ICIC-engaged WDCS cells, to non-ICIC-engaged WDCS cells in multiple sectors.
Figure 6B:
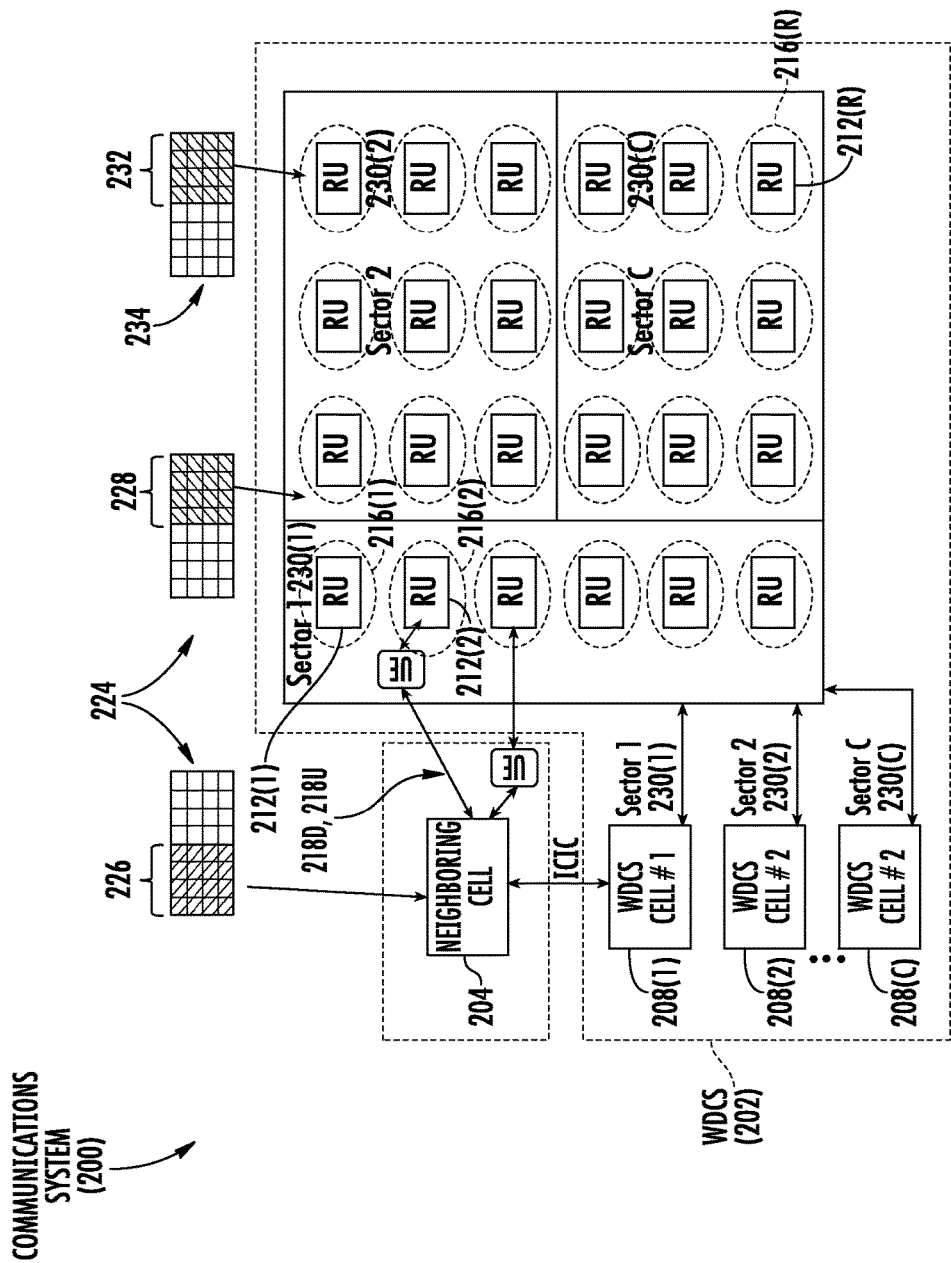

FIGS. 6A and 6B are schematic diagrams of the communications system 200 in FIG. 2 that include examples of the WDCS 202 configuring cell assignment of the ICIC-engaged and non-ICIC-engaged remote units 212(1)-212(R) in different manners. As shown in FIG. 6A, the cell assignment configuration controls the remote units 212(1)-212(R) to be assigned to WDCS cells 208(1)-208(C) in multiple sectors, sector 230(1), 230(2), and 230(C). All WDCS cells 208(1)-208(C) in this example use the same channel frequency. It may be desired for certain remote units 212(1)-212(R) to be in one or both sector 230(1) and 230(C) to be assigned to one or both WDCS cells 208(1), 208(C) to exchange communications signals with the WDCS cells 208(1), 208(C). The ICIC-engaged remote units 212(1)-212(R) exposed to the neighboring cell 204 are assigned to WDCS cell 208(1) to be in sector 230(1) and 230(C) sharing RRM 224. The non-ICIC-engaged remote units 212(1)-212(R) not exposed to the neighboring cell 204 are assigned to WDCS cell 208(2) to be in sector 230(2) and do not share the RRM 224. In FIG. 6B, the cell assignment configuration 306 has provided that the remote units 212(1)-212(R) also be assigned to WDCS cells 208(1)-208(C) in multiple sectors, sector 230(1), 230 (2), and 230(C). But the sectors 230(1), 230(2), and 230(C) are arranged differently. The WDCS cells 208(2), 208(C) that are assigned to remote units 212(1)-212(R) in sectors 230(1), 230(C) share a separate RRM 234 from the RRM 224 shared between the WDCS cell 208(1) and the neighboring cell 204.

As previously discussed above with regard to the WDCS 202 of FIGS. 2 and 3, the downlink communications media 304D(1)-304D(R) is monitored to determine the remote unit 212(1)-212(R) that receives downlink communications signals 218D(1)-218D(O) from the neighboring cell 204. There can be other ways and methods to determine which remote units 212(1)-212(R) in a WDCS 202 are ICIC-engaged with a neighboring cell 204(1)-204(O) to then then provide for automatic configuration of cell assignment of these ICIC-engaged remote units 212(1)-212(R).

Figure 7:
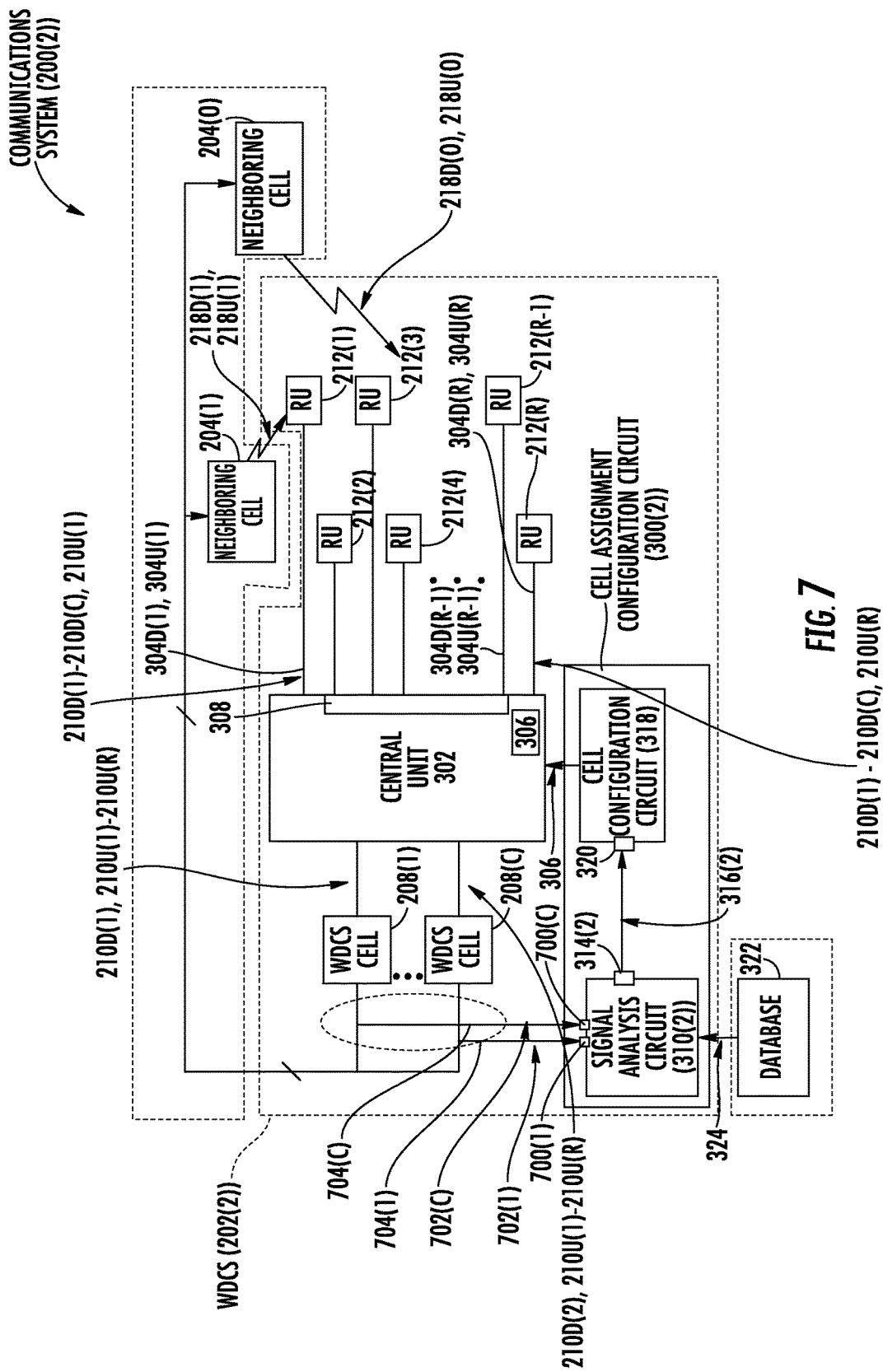
FIG. 7 is a schematic diagram of another exemplary WDCS that includes a cell assignment configuration circuit configured to receive ICIC messages between a neighboring cell and WDCS cells to identify ICIC-engaged WDCS cells, for automatic configuration of cell assignment of non-ICIC-engaged remote units assigned to the ICIC-engaged WDCS cells, to non-ICIC-engaged WDCS cells.

For example, FIG. 7 is a schematic diagram of another exemplary WDCS 202(2) in a communications system 200 (2) that is similar to the WDCS 202 in FIG. 3. Common components between the communications system 200(2) in FIG. 7 and the communications system 200 in FIGS. 2 and 3 are shown with common element numbers, and thus will not be re-described.

The WDCS 202(2) in FIG. 7 includes a includes a cell assignment configuration circuit 300(2) configured to receive ICIC messages between the neighboring cells 204 (1)-204(O) and the WDCS cells 208(1)-208(C) to identify the ICIC-engaged WDCS cells 208(1)-208(C) engaged in ICIC with the neighboring cells 204(1)-204(O). This information is used for automatic configuration of cell assignment/re-assignment of the non-ICIC-engaged remote units 212(1)-212(R). In this regard, the cell assignment configuration circuit 300(2) in this example includes a signal analysis circuit 310(2). The signal analysis circuit 310(2) is configured to receive ICIC messages 702(1)-702(C) communicated between the neighboring cells 204(1)-204(O) and the WDCS cells 208(1)-208(C) on the signal analysis inputs 700(1)-700(C). An ICIC communications link 704(1)-704 (C) is provided that couples the neighboring cells 204(1)-204(O) and the WDCS cells 208(1)-208(C). For example, the ICIC communications link 704(1)-704(C) may be a single bus, such as an X2 communications bus, or dedicated communications links. The signal analysis circuit 310(2) is configured to identify the WDCS cells 208(1)-208(C) in ICIC with the neighboring cells 204(1)-204(O). The signal analysis circuit 310(2) is configured to communicate on a signal analysis output 314(2), a neighboring cell indicator 316(2) indicating the WDCS cells 208(1)-208(C) identified engaged in ICIC with the neighboring cells 204(1)-204(O).

With continuing reference to FIG. 7, the cell assignment configuration circuit 300(2) in this example also includes the cell configuration circuit 318. The cell configuration circuit 318 is configured to receive the neighboring cell indicator 316(2) on the cell configuration input 320 communicatively coupled to the signal analysis output 314(2). The cell configuration circuit 318 is configured identify any ICIC-engaged WDCS cells 208(1)-208(C) in the WDCS 202(2) in ICIC with a neighboring cells 204(1)-204(O) based on the neighboring cell indicator 316(2). The cell configuration circuit 318 is configured to determine if any remote units 212(1)-212(R) are assigned to the identified ICIC-engaged WDCS cells 208(1)-208(C) based on the neighboring cell indicator 316(2). The cell configuration circuit 318 is then configured to determine the cell assignment configuration 306 for the WDCS 202(2) based on assigning remote units 212(1)-212(R) in the WDCS 202(2) currently assigned to an ICIC-engaged WDCS cell 208(1)-208(C), to a non-ICIC-engaged WDCS cell 208(1)-208(C). The cell configuration circuit 318 is then configured to configure or re-configure the cell assignment of one or more non-ICIC-engaged remote units 212(1)-212(R) in the WDCS 202(2) based on the determined cell assignment configuration 306. As previously discussed above, the cell assignment configuration 306 determines which downlink communications signals 210D(1)-210D(C) from the WDCS cell 208(1)-208(C) are routed by the router circuit 308 to the remote units 212(1)-212(R). The cell configuration circuit 318 communicates a new cell assignment configuration 306 to the central unit 302 to then control the router circuit 308 to direct the downlink and uplink communications signals 210D(1)-210D(C), 210U(1)-210U(R) to and from the remote units 212(1)-212(R) as assigned to the WDCS cells 208(1)-208 (C).

Figure 8:
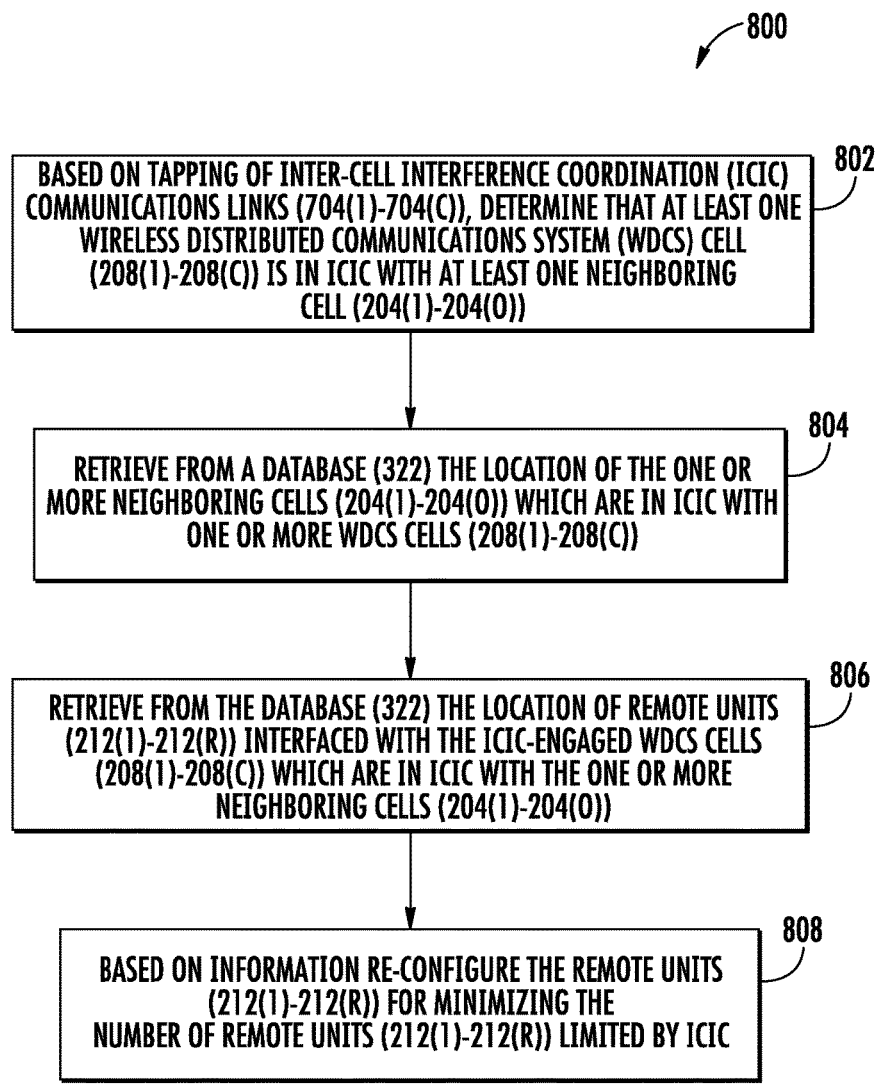
FIG. 8 is a flowchart illustrating an exemplary process of the cell assignment configuration circuit in the WDCS of FIG. 7 automatically configuring cell assignment of non-ICIC-engaged remote units assigned to ICIC-engaged WDCS cells, to non-ICIC-engaged WDCS cells.

Note that the techniques and processes in the WDCS 202(2) explained in FIGS. 7 and 8 to identify the ICIC-engaged WDCS cells 208(1)-208(C) engaged in ICIC with the neighboring cells 204(1)-204(O) for assignment configuration of non-engaged remote units 212(1)-212(R) to non-ICIC-engaged WDCS cells 208(1)-208(C). The can be used in conjunction with the techniques and processes in the WDCS 202 explained in FIGS. 3-6A to identify the ICIC-engaged WDCS cells 208(1)-208(C) engaged in ICIC with the neighboring cells 204(1)-204(O) for assignment configuration of non-ICIC-engaged remote units 212(1)-212(R) to non-ICIC-engaged WDCS cells 208(1)-208(C). FIG. 8 is a flowchart illustrating an exemplary process 800 of the cell assignment configuration circuit 300(2) in the WDCS 202(2) of FIG. 7 automatically configuring cell assignment of ICIC-engaged remote units 212(1)-212(R) in the WDCS 202(2). In this regard, as discussed above, based on the ICIC messages 702(1)-702(C) received on the ICIC communications links 704(1)-704(C), the signal analysis circuit 310(2) is configured to determine if any WDCS cells 208(1)-208(C) are in ICIC with the neighboring cells 204(1)-204(O) (block 802). This information is provided in the neighboring cell indicator 316(2) from the signal analysis circuit 310(2) to the cell configuration circuit 318. The cell configuration circuit 318 can then retrieve from the database 322, the location of the neighboring cells 204(1)-204(O) engaged in ICIC with the WDCS cells 208(1)-208(C) (block 804). The cell configuration circuit 318 can also retrieve from the database 322, the location of the remote units 212(1)-212(R) assigned to the WDCS cells 208(1)-208(C) that are ICIC-engaged with the neighboring cells 204(1)-204(O) (block 806). Based on the location of the ICIC-engaged remote units 212(1)-212(R) and the location of the neighboring cells 204(1)-204(O) in ICIC with the WDCS cells 208(1)-208(C) assigned to the ICIC-engaged remote units 212(1)-212(R), the cell assignment configuration 306 can be re-configured by the cell configuration circuit 318 to reduce or avoid the identified ICIC-engaged remote units 212(1)-212(R) being assigned the ICIC-engaged WDCS cells 208(1)-208(C) (block 808).

Figure 9:
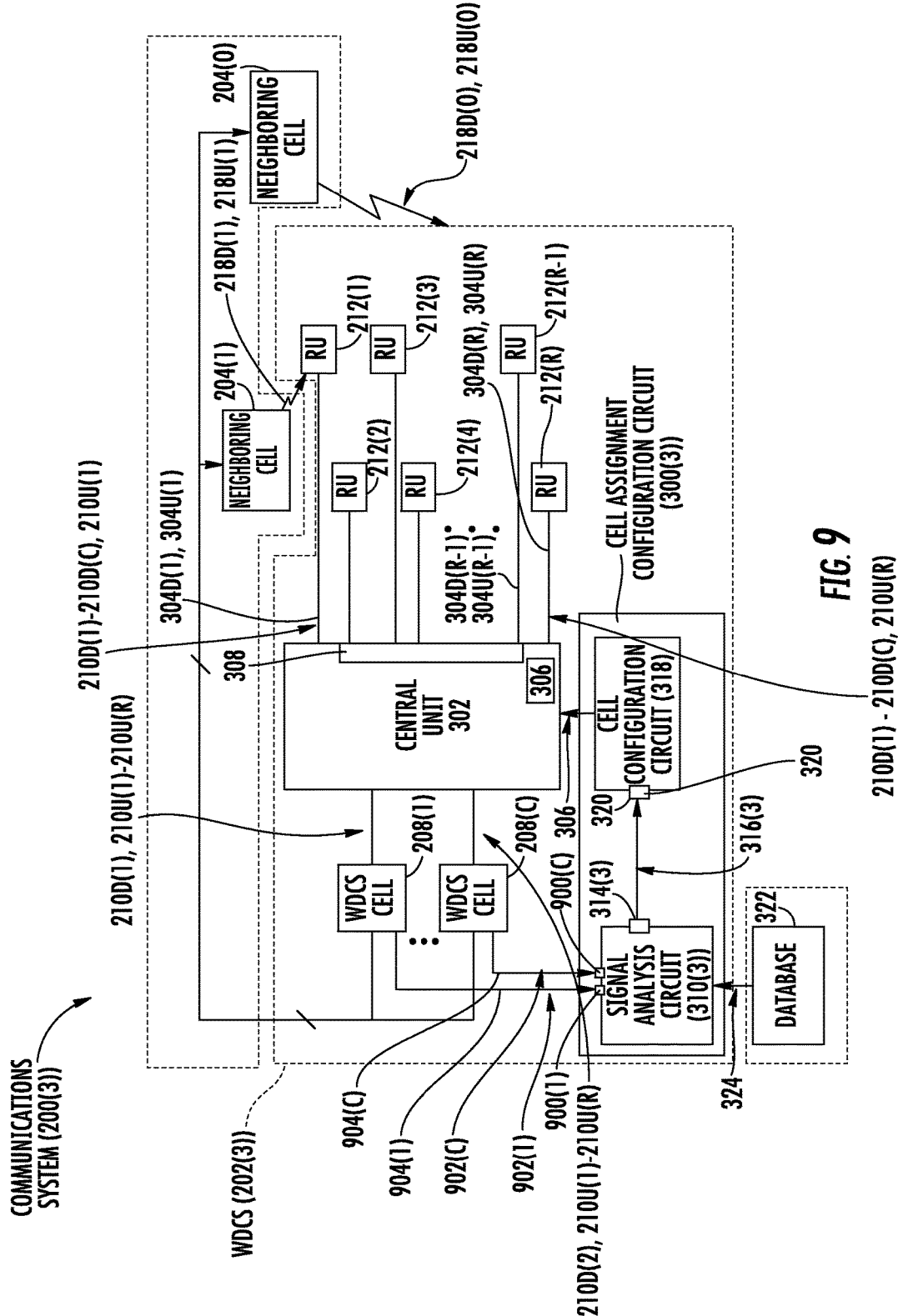
FIG. 9 is a schematic diagram of another exemplary WDCS that includes a cell assignment configuration circuit configured to receive ICIC messages between a neighboring cell and the WDCS cells to identify ICIC-engaged WDCS cells, for automatic configuration of cell assignment of non-ICIC-engaged remote units assigned to the ICIC-engaged WDCS cells, to non-ICIC-engaged WDCS cells.

FIG. 9 is a schematic diagram of another exemplary WDCS 202(3) in a communications system 200(3) that is similar to the WDCS 202(2) of FIG. 7. Common components between the communications system 200(3) in FIG. 9 and the communications system 200(2) in FIG. 7 are shown with common element numbers, and thus will not be re-described. The WDCS 202(3) of FIG. 9 includes a includes a cell assignment configuration circuit 300(3) configured to receive cell messages from the WDCS cells 208(1)-208(C) to identify the ICIC-engaged WDCS cells 208(1)-208(C) engaged in ICIC with the neighboring cells 204(1)-204(O), for automatic configuration of cell assignment of remote units 212(1)-212(R). In this regard, the cell assignment configuration circuit 300(3) in this example includes a signal analysis circuit 310(3). The signal analysis circuit 310(3) is configured to receive on signal analysis inputs 900(1)-900 (C), cell messages 902(1)-902(C) from the WDCS cells 208(1)-208(C) indicating if the WDCS cell 208(1)-208(C) is engaged in ICIC with a neighboring cell 204(1)-204(O). Cell communications links 904(1)-904(C) are provided that couple the WDCS cells 208(1)-208(C) to the signal analysis inputs 900(1)-900(C) of the signal analysis circuit 310(3). For example, the cell communications links 904(1)-904(C) may be a single bus, such as an X2 communications bus, or dedicated communications links. The signal analysis circuit 310(3) is configured to identify the WDCS cells 208(1)-208 (C) in ICIC with the neighboring cells 204(1)-204(O). The signal analysis circuit 310(3) is configured to communicate a neighboring cell indicator 316(3) indicating the WDCS cells 208(1)-208(C) identified engaged in ICIC with the neighboring cells 204(1)-204(O) on a signal analysis output 314(3).

With continuing reference to FIG. 9, the cell assignment configuration circuit 300(3) in this example also includes the cell configuration circuit 318. The cell configuration circuit 318 is configured to receive the neighboring cell indicator 316(3) on the cell configuration input 320 communicatively coupled to the signal analysis output 314(3). The cell configuration circuit 318 is configured identify any ICIC-engaged WDCS cells 208(1)-208(C) in the WDCS 202(3) in ICIC with a neighboring cells 204(1)-204(O) based on the neighboring cell indicator 316(3). The cell configuration circuit 318 is configured to determine if any remote units 212(1)-212(R) are assigned to the identified ICIC-engaged WDCS cells 208(1)-208(C) based on the neighboring cell indicator 316(3). The cell configuration circuit 318 is then configured to determine the cell assignment configuration 306 for the WDCS 202(3) based on assigning ICIC-engaged remote units 212(1)-212(R) in the WDCS 202(3) currently assigned to an ICIC-engaged WDCS cell 208(1)-208(C), to a non-ICIC-engaged WDCS cell 208(1)-208(C). The cell configuration circuit 318 is then configured to configure or re-configure the cell assignment of one or more non-ICIC-engaged remote units 212(1)-212(R) in the WDCS 202(3) based on the determined cell assignment configuration 306. As previously discussed above, the cell assignment configuration 306 determines which downlink communications signals 210D(1)-210D(C) from the WDCS cell 208(1)-208 (C) are routed by the router circuit 308 to the remote units 212(1)-212(R). The cell configuration circuit 318 communicates a new cell assignment configuration 306 to the central unit 302 to then control the router circuit 308 to direct the downlink and uplink communications signals 210D(1)-210D(C), 210U(1)-210U(R) to and from the remote units 212(1)-212(R) as assigned to the WDCS cells 208(1)-208(C).

Figure 10:
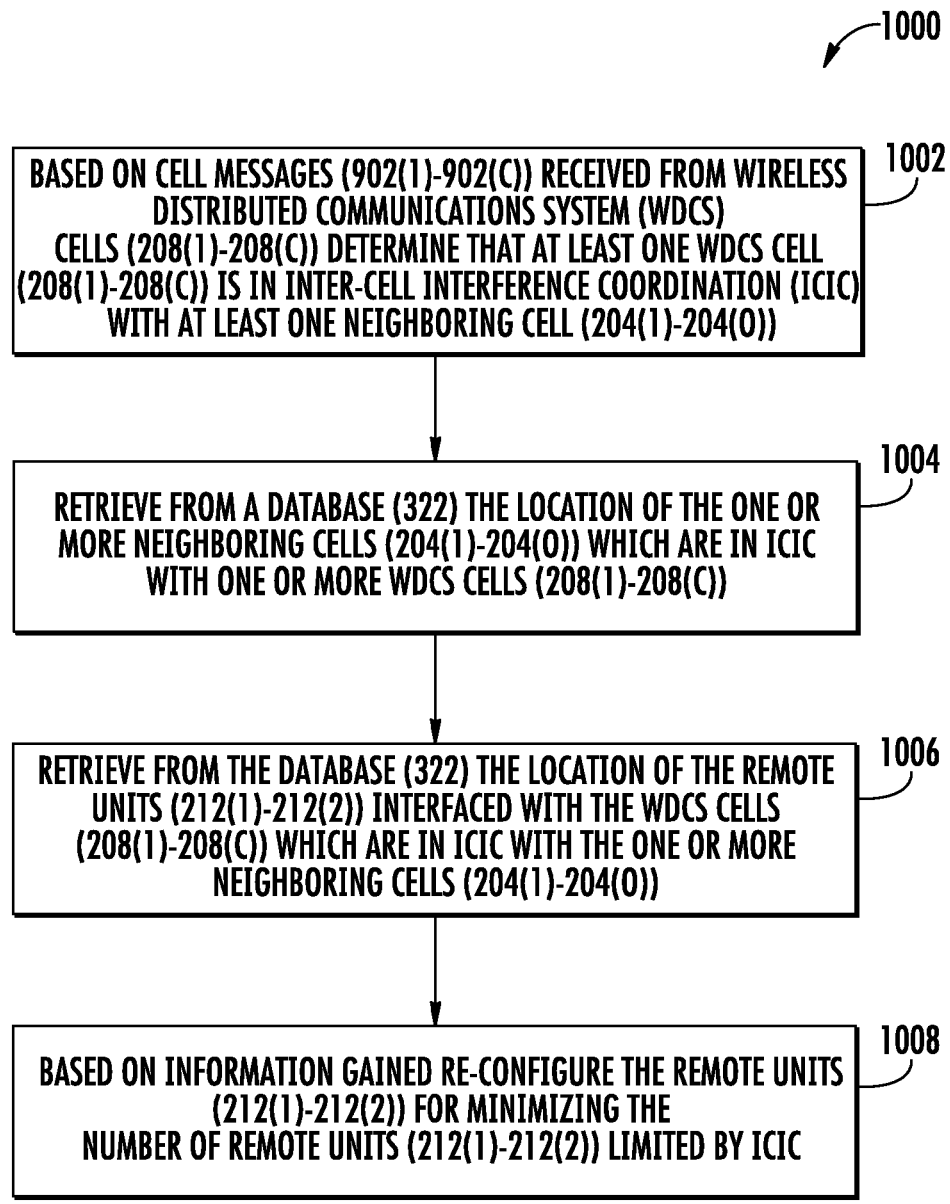
FIG. 10 is a flowchart illustrating an exemplary process of the cell assignment configuration circuit in the WDCS of FIG. 9 automatically configuring cell assignment of non-ICIC-engaged remote units assigned to the ICIC-engaged WDCS cells, to non-ICIC-engaged WDCS cells.

FIG. 10 is a flowchart illustrating an exemplary process 1000 of the cell assignment configuration circuit 300(3) in the WDCS 202(3) in FIG. 9 automatically configuring cell assignment of ICIC-engaged remote units 212(1)-212(R) in the WDCS 202(3). In this regard, as discussed above, based on the cell messages 902(1)-902(C) received on the cell communications links 904(1)-904(C), the signal analysis circuit 310(3) is configured to determine if any WDCS cells 208(1)-208(C) are in ICIC with the neighboring cells 204 (1)-204(O) (block 1002). This information is provided in the neighboring cell indicator 316(3) from the signal analysis circuit 310(3) to the cell configuration circuit 318. The cell configuration circuit 318 can then retrieve from the database 322, the location of the neighboring cells 204(1)-204(O) that are engaged in ICIC with the WDCS cells 208(1)-208(C) (block 1004). The cell configuration circuit 318 can also retrieve from the database 322, the location of the remote units 212(1)-212(R) assigned to the WDCS cells 208(1)-208(C) that that are ICIC-engaged with the neighboring cells 204(1)-204(O) (block 1006). Based on the location of the ICIC-engaged remote units 212(1)-212(R) and the location of the neighboring cells 204(1)-204(O) in ICIC with the WDCS cells 208(1)-208(C) assigned to the ICIC-engaged remote units 212(1)-212(R), the cell assignment configuration 306 can be re-configured by the cell configuration circuit 318 to reduce or avoid the identified ICIC-engaged remote units 212(1)-212(R) being assigned the ICIC-engaged WDCS cells 208(1)-208(C) (block 1008).

Note that the techniques and processes for the WDCSs 202, 202(1), 202(2), 202(3) explained above can be used in conjunction with each other to identify ICIC-engaged WDCS cells 208(1)-208(C) engaged in ICIC with the neighboring cells 204(1)-204(O) for assignment configuration of non-ICIC-engaged remote units 212(1)-212(R) to non-ICIC-engaged WDCS cells 208(1)-208(C).

Note that any of the communications signals, bands, and services described herein may be RF communications signals, bands, and services. Supported RF communications services in the WDCSs disclosed herein can include any communications bands desired. Examples of communications services include, but are not limited to, the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The communications bands may include licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink). Further, the WDCS can be configured to support any wireless technologies desired, including but not limited to Code Division Multiple Access (CDMA), CDMA200, 1xRTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

Figure 11:
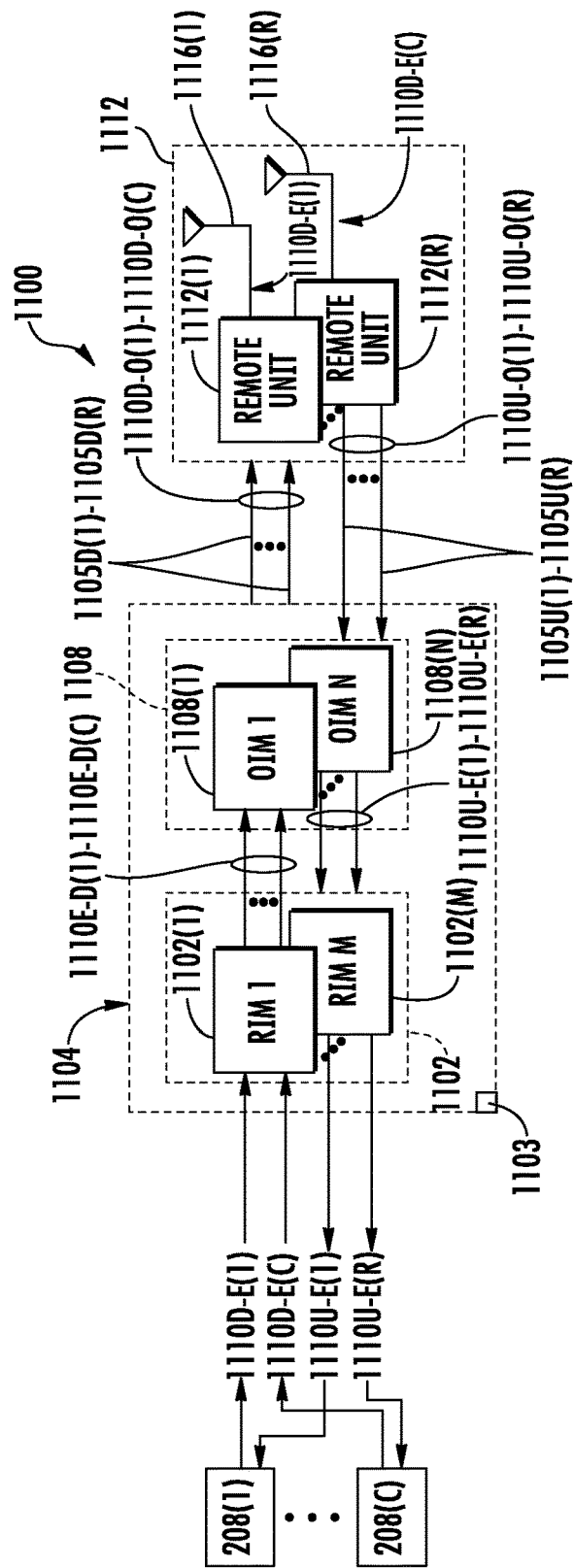
FIG. 11 is a schematic diagram of an exemplary WDCS provided in the form of an optical fiber-based WDCS configured to automatically configure cell assignment of non-ICIC-engaged remote units assigned to ICIC-engaged WDCS cells, to non-ICIC-engaged WDCS cells.

A WDCS configured to automatically configure cell assignment of ICIC-engaged remote units in a WDCS to avoid or reduce dividing radio resources to non-ICIC-engaged remote units in the WDCS can be provided as an optical-based WDCS. In this regard, FIG. 11 is a schematic diagram of such an exemplary optical-fiber based WDCS 1100. The WDCS 1100 includes a cell assignment configuration circuit 1103, which may be any of the cell assignment configuration circuits previously discussed, including cell assignment configuration circuits 300, 300(2), 300(3) in FIGS. 3, 7, and 9. The optical-fiber based WDCS 1100 is comprised of three (3) main components. One or more radio interfaces provided in the form of radio interface modules (RIMs) 1102(1)-1102(M) are provided in a central unit 1104 to receive and process electrical downlink communications signals 1110D-E(1)-1110D-E(C) received from WDCS cells 208(1)-208(C) prior to optical conversion into optical downlink communications signals. The RIMs 1102(1)-1102(M) provide both downlink and uplink interfaces for signal processing. The notations "1-M" and "1-C" indicate that any number of the referenced component, 1-M and 1-C, respectively, may be provided.

With continuing reference to FIG. 11, the central unit 1104 is configured to accept the plurality of RIMs 1102(1)-1102(M) as modular components that can easily be installed and removed or replaced in the central unit 1104. In one embodiment, the central unit 1104 is configured to support up to twelve (13) RIMs 1102(1)-1102(13). Each RIM 1102 (1)-1102(M) can be designed to support a particular type of radio source or range of radio sources (i.e., frequencies) to provide flexibility in configuring the central unit 1104 and the WDCS 1100 to support the desired radio sources. For example, one RIM 1102 may be configured to support the Personal Communication Services (PCS) radio band. Another RIM 1102 may be configured to support the 700 MHz radio band. In this example, by inclusion of these RIMs 1102, the central unit 1104 could be configured to support and distribute communications signals, including those for the communications services and communications bands described above as examples.

The RIMs 1102(1)-1102(M) may be provided in the central unit 1104 that support any frequencies desired, including but not limited to licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-

1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 11, the electrical downlink communications signals 1110D-E(1)-1110D-E(C) may be provided as downlink electrical spectrum chunks to a plurality of optical interfaces provided in the form of optical interface modules (OIMs) 1108(1)-1108(N) in this embodiment to convert the unlicensed and/or licensed electrical downlink communications signals 1110D-E(1)-1110D-E(C) into optical downlink communications signals 1110D-O(1)-1110D-O(C). The OIMs 1108 may be configured to provide one or more optical interface components (OICs) that contain optical-to-electrical (O-E) and electrical-to-optical (E-O) converters, as will be described in more detail below. The OIMs 1108 support the radio bands that can be provided by the RIMs 1102, including the examples previously described above.

The OIMs 1108(1)-1108(N) each include E-O converters to convert the electrical downlink communications signals 1110D-E(1)-1110D-E(C) into the optical downlink communications signals 1110D-O(1)-1110D-O(C). The optical downlink communications signals 1110D-O(1)-1110D-O(C) are communicated over downlink optical fiber communications medium 1105D(1)-1105D(R) to a plurality of remote units 1112(1)-1112(R). O-E converters provided in the remote units 1112(1)-1112(R) convert the optical downlink communications signals 1110D-O(1)-1110D-O(C) back into the electrical downlink communications signals 1110D-E(1)-1110D-E(C), which are provided to antennas 1116(1)-1116(R) in the remote units 1112(1)-1112(R) to user equipment (not shown) in the reception range of the antennas 1116(1)-1116(R).

E-O converters are also provided in the remote units 1112(1)-1112(R) to convert electrical uplink communications signals 1110U-E(1)-1110U-E(R) received from user equipment (not shown) through the antennas 1116(1)-1116(R) into optical uplink communications signals 1110U-O(1)-1110U-O(R). The remote units 1112(1)-1112(R) communicate the optical uplink communications signals 1110U-O(1)-1110U-O(R) over an uplink optical fiber communications medium 1105U(1)-1105U(R) to the OIMs 1108(1)-1108(N) in the central unit 1104. The OIMs 1108(1)-1108(N) include O-E converters that convert the received optical uplink communications signals 1110U-O(1)-1110U-O(R) into electrical uplink communications signals 1110U-E(1)-1110U-E(R), which are processed by the RIMs 1102(1)-1102(M) and provided as electrical uplink communications signals 1110U-E(1)-1110U-E(R). The central unit 1104 may provide the electrical uplink communications signals 1110U-E(1)-1110U-E(R) to the WDCS cells 208(1)-208(C).

Note that the downlink optical fiber communications medium 1105D(1)-1105D(R) and uplink optical fiber communications medium 1105U(1)-1105U(R) connected to each remote unit 1112(1)-1112(R) may be a common optical fiber communications medium, wherein for example, wave division multiplexing (WDM) may be employed to provide the optical downlink communications signals 1110D-O(1)-1110D-O(C) and the optical uplink communications signals 1110U-O(1)-1110U-O(R) on the same optical fiber communications medium.

Figure 12:
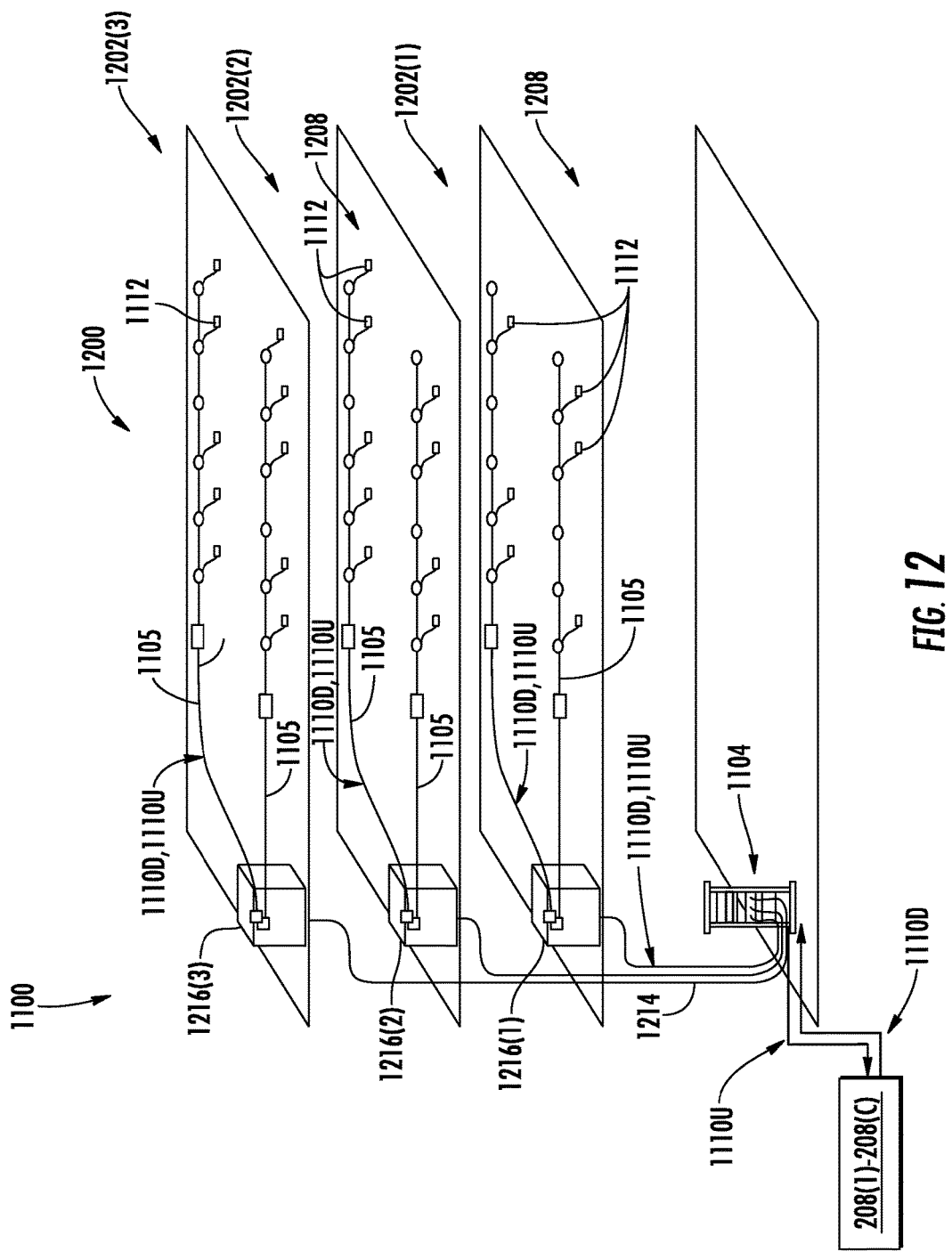
FIG. 12 is a partially schematic cut-away diagram of an exemplary building infrastructure in which a WDCS, including but not limited to the WDCSs of FIGS. 2, 3, 6A-6B, 7, 9, and 11 can be provided.

A WDCS configured to automatically configure cell assignment of ICIC-engaged remote units in a WDCS to avoid or reduce dividing radio resources to non-ICIC-engaged remote units, including but not limited to the WDCSs in FIGS. 2, 3 and 6A-6B, 7, 9, 11, can be provided in an indoor environment, such as illustrated in FIG. 12. In this regard, FIG. 12 is a partially schematic cut-away diagram of a building infrastructure 1200 employing the WDCS 1100 of FIG. 11. The building infrastructure 1200 in this embodiment includes a first (ground) floor 1202(1), a second floor 1202(2), and a third floor 1202(3). The floors 1202(1)-1202(3) are serviced by the central unit 1104 to provide the antenna coverage areas 1208 in the building infrastructure 1200. The central unit 1104 is communicatively coupled to a WDCS cell 208(1)-208(C) to receive downlink communications signals 1110D. The central unit 1104 is communicatively coupled to the remote units 1112 to receive uplink communications signals 1110U from the remote units 1112, similar to as previously discussed above for other WDCSs. The downlink and uplink communications signals 1110D, 1110U communicated between the central unit 1104 and the remote units 1112 are carried over a riser cable 1214 in this example. The riser cable 1214 may be routed through interconnect units (ICUs) 1216(1)-1216(3) dedicated to each floor 1202(1)-1202(3) that route the downlink and uplink communications signals 1110D, 1110U to the remote units 1112 and also provide power to the remote units 1112 via the downlink and uplink communications media 1105D, 1105U.

Figure 13:
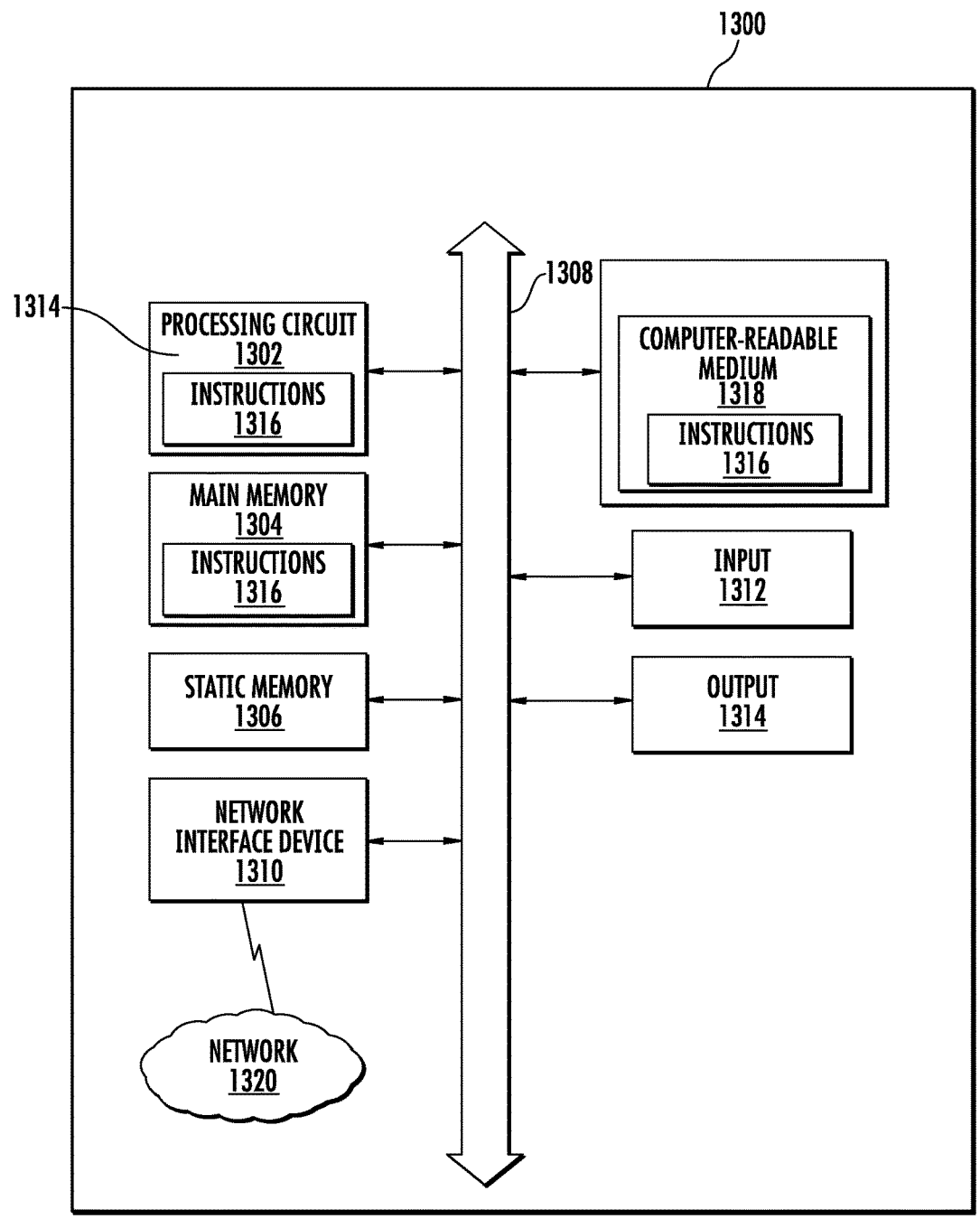
FIG. 13 is a schematic diagram of an exemplary computer system that can be included in any component in a WDCS, including but not limited to the WDCSs of FIGS. 2, 3, 6A-6B, 7, 9, and 11, including for facilitating automatic configuration of cell assignment of non-ICIC-engaged remote units assigned to ICIC-engaged WDCS cells, to non-ICIC-engaged WDCS cells, wherein the computer system is adapted to execute instructions from an exemplary computer readable link.

FIG. 13 is a schematic diagram representation of additional detail illustrating a computer system 1300 that could be employed in any of the circuits in a WDCS configured to automatically configure cell assignment of ICIC-engaged remote units in a WDCS to avoid or reduce dividing radio resources for remote units in the WDCS cells not engaged in ICIC, including but not limited to the WDCSs in FIGS. 2, 3, 6A-6B, 7, 9, 11, and 12. For example, the computer system 1300 could provide the cell assignment configuration circuits 300, 300(2), 300(3) in FIGS. 3, 7, and 9, the cell configuration circuit 318 in FIGS. 3, 7, and 9, and the signal analysis circuits 310, 310(2), 310(3) in FIGS. 3, 7, and 9. In this regard, the computer system 1300 is adapted to execute instructions from an exemplary computer-readable medium to perform these and/or any of the functions or processing described herein.

In this regard, the computer system 1300 in FIG. 13 may include a set of instructions that may be executed to program and configure programmable digital signal processing circuits in a WDCS for supporting scaling of supported communications services. The computer system 1300 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1300 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1300 in this embodiment includes a processing device or processor 1302, a main memory 1304 (e.g., read-only memory (ROM), flash memory, dynamic random access memory (DRAM), such as synchronous DRAM (SDRAM), etc.), and a static memory 1306 (e.g., flash memory, static random access memory (SRAM), etc.), which may communicate with each other via a data bus 1308. Alternatively, the processor 1302 may be connected to the main memory 1304 and/or static memory 1306 directly or via some other connectivity means. The processor 1302 may be a controller, and the main memory 1304 or static memory 1306 may be any type of memory.

The processor 1302 represents one or more general-purpose processing devices, such as a microprocessor, central processing unit, or the like. More particularly, the processor 1302 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1302 is configured to execute processing logic in instructions for performing the operations and steps discussed herein.

The computer system 1300 may further include a network interface device 1310. The computer system 1300 also may or may not include an input 1312, configured to receive input and selections to be communicated to the computer system 1300 when executing instructions. The computer system 1300 also may or may not include an output 1314, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1300 may or may not include a data storage device that includes instructions 1316 stored in a computer-readable medium 1318. The instructions 1316 may also reside, completely or at least partially, within the main memory 1304 and/or within the processor 1302 during execution thereof by the computer system 1300, the main memory 1304 and the processor 1302 also constituting computer-readable medium. The instructions 1316 may further be transmitted or received over a network 1320 via the network interface device 1310.

While the computer-readable medium 1318 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A cell assignment configuration circuit for a wireless distribution communications system (WDCS) that includes at least two WDCS cells each configured to exchange communications signals with a plurality of remote units, the cell assignment configuration circuit configured to:
   identify at least one remote unit among the plurality of remote units in the WDCS receiving downlink communications signals potentially transmitted by at least one neighboring cell to the WDCS;
   identify at least one Inter-Cell Interference Coordination (ICIC)-engaged WDCS cell in the WDCS in ICIC with the at least one neighboring cell based on a WDCS cell in the WDCS assigned to the identified at least one remote unit receiving downlink communications signals potentially transmitted by the at least one neighboring cell to the WDCS;
   determine at least one non-ICIC-engaged remote unit assigned to the identified at least one ICIC-engaged WDCS cell not identified as receiving downlink communications signals transmitted by the at least one neighboring cell;
   determine a cell assignment configuration for the WDCS based on reassigning the at least one non-ICIC-engaged remote unit to a non-ICIC-engaged WDCS cell; and
   configure a cell assignment of at least one remote unit in the WDCS based on the determined cell assignment configuration.

2. The cell assignment configuration circuit of claim 1 further configured to receive the downlink communications signals communicated to the plurality of remote units in the WDCS.

3. The cell assignment configuration circuit of claim 1 further configured to receive ICIC messages communicated between the at least one neighboring cell and the at least two WDCS cells;
   the cell assignment configuration circuit configured to identify the at least one remote unit in the WDCS receiving the downlink communications signals potentially transmitted by the at least one neighboring cell to the WDCS, based on the received ICIC messages.

4. The cell assignment configuration circuit of claim 1 further configured to receive cell messages from the at least two WDCS cells;
   the cell assignment configuration circuit configured to identify the at least one remote unit in the WDCS receiving the downlink communications signals potentially transmitted by the at least one neighboring cell to the WDCS, based on the received cell messages.

5. The cell assignment configuration circuit of claim 1, comprising:
   at least one signal analysis circuit comprising:
      at least one signal analysis input configured to receive at least one downlink communications signal communicated to the at least one remote unit in the WDCS; and
      at least one signal analysis output;
      the at least one signal analysis circuit configured to:
         receive the at least one downlink communications signal communicated to the at least one remote unit in the WDCS on the at least one signal analysis input;
         identify the at least one remote unit among the plurality of remote units in the WDCS receiving the downlink communications signals potentially transmitted by the at least one neighboring cell to the WDCS; and
         communicate on the at least one signal analysis output, at least one neighboring cell indicator indicating the at least one remote unit identified as receiving the at least one downlink communications signal potentially transmitted by the at least one neighboring cell; and
   a cell configuration circuit comprising:
      a cell configuration input communicatively coupled to the at least one signal analysis output;
      the cell configuration circuit configured to:
         receive the at least one neighboring cell indicator on the cell configuration input;

identify the at least one ICIC-engaged WDCS cell in the WDCS in ICIC with the at least one neighboring cell based on the at least two WDCS cells in the WDCS assigned to the identified at least one remote unit receiving the downlink communications signals potentially transmitted by the at least one neighboring cell to the WDCS indicated in the at least one neighboring cell indicator;

determine the at least one non-ICIC-engaged remote unit assigned to the identified at least one ICIC-engaged WDCS cell and not identified as receiving the downlink communications signals transmitted by the at least one neighboring cell, based on the at least one neighboring cell indicator;

determine the cell assignment configuration for the WDCS based on reassigning the at least one non-ICIC-engaged remote unit in the WDCS currently assigned to a non-ICIC-engaged WDCS cell; and configure the cell assignment of the at least one non-ICIC-engaged remote unit in the WDCS based on the determined cell assignment configuration.

6. The cell assignment configuration circuit of claim 1 configured to identify the at least one remote unit receiving downlink communications signals potentially transmitted by the at least one neighboring cell to the WDCS, by being configured to identify the at least one remote unit in the WDCS receiving the downlink communications signals having a power level higher than a predefined threshold power level.

7. The cell assignment configuration circuit of claim 1 configured to identify the at least one ICIC-engaged WDCS cell in the WDCS in ICIC, by being configured to identify a global cell identification (ID) (GCID) of the at least one ICIC-engaged WDCS cell in the WDCS in ICIC with the at least one neighboring cell based on the at least two WDCS cells in the WDCS assigned to the identified at least one remote unit receiving the downlink communications signals potentially transmitted by the at least one neighboring cell to the WDCS.

8. The cell assignment configuration circuit of claim 1 configured to identify the at least one ICIC-engaged WDCS cell in the WDCS in ICIC by being configured to identify a physical cell identification (ID) (PCI) of at least one ICIC-engaged WDCS cell in the WDCS in ICIC with the at least one neighboring cell based on the at least two WDCS cells in the WDCS assigned to the identified at least one remote unit receiving the downlink communications signals potentially transmitted by the at least one neighboring cell to the WDCS.

9. The cell assignment configuration circuit of claim 1 further configured to obtain a location of the identified at least one ICIC-engaged WDCS cell.

10. The cell assignment configuration circuit of claim 1 further configured to obtain a location of the identified at least one remote unit receiving the downlink communications signals potentially transmitted by the at least one neighboring cell to the WDCS.

11. The cell assignment configuration circuit of claim 1 further configured to:

obtain a location of the identified at least one ICIC-engaged WDCS cell;

obtain a location of the at least one ICIC-engaged remote unit in the WDCS; and determine the cell assignment configuration for the WDCS based on reassigning the at least one non-ICIC-engaged remote unit in the WDCS currently assigned to a non-ICIC-engaged WDCS cell, the location of the at least one ICIC-engaged WDCS cell, and the location of the at least one ICIC-engaged remote unit.

12. A method of configuring cell assignment of Inter-Cell Interference Coordination (ICIC)-engaged remote units in a wireless distribution communications system (WDCS), comprising:

identifying at least one remote unit in the WDCS receiving downlink communications signals potentially transmitted by at least one neighboring cell to the WDCS;

identifying at least one ICIC-engaged WDCS cell in the WDCS in ICIC with the at least one neighboring cell based on WDCS cells in the WDCS assigned to the at least one identified remote unit receiving downlink communications signals potentially transmitted by the at least one neighboring cell to the WDCS;

determining at least one non-ICIC-engaged remote unit assigned to the identified at least one ICIC-engaged WDCS cell and not identified as receiving the downlink communications signals transmitted by the at least one neighboring cell;

determining a cell assignment configuration for the WDCS based on reassigning the at least one non-ICIC-engaged remote unit to a non-ICIC-engaged WDCS cell; and configuring a cell assignment of at least one remote unit in the WDCS based on the determined cell assignment configuration.

13. The method of claim 12, further comprising receiving ICIC messages communicated between the at least one neighboring cell and the WDCS cells; and comprising identifying the at least one remote unit in the WDCS receiving the downlink communications signals potentially transmitted by the at least one neighboring cell to the WDCS, based on the received ICIC messages.

14. The method of claim 12, further comprising receiving cell messages from the WDCS cells; and comprising identifying the at least one remote unit in the WDCS receiving the downlink communications signals potentially transmitted by the at least one neighboring cell to the WDCS, based on the received cell messages.

15. The method of claim 12, wherein identifying the at least one remote unit receiving the downlink communications signals potentially transmitted by the at least one neighboring cell to the WDCS comprises identifying the at least one remote unit in the WDCS receiving the downlink communications signals having a power level higher than a predefined threshold power level.

16. The method of claim 12, wherein identifying the at least one ICIC-engaged WDCS cell in the WDCS in ICIC comprises identifying a global cell identification (ID) (GCID) of the at least one ICIC-engaged WDCS cell in the WDCS in ICIC with the at least one neighboring cell based on the WDCS cells in the WDCS assigned to the identified at least one remote unit receiving the downlink communications signals potentially transmitted by the at least one neighboring cell to the WDCS.

17. The method of claim 12, wherein identifying the at least one ICIC-engaged WDCS cell in the WDCS in ICIC comprises identifying a physical cell identification (ID) (PCI) of the at least one ICIC-engaged WDCS cell in the WDCS in ICIC with the at least one neighboring cell based on the WDCS cells in the WDCS assigned to the identified at least one remote unit receiving the downlink communications signals potentially transmitted by the at least one neighboring cell to the WDCS.

18. The method of claim 12, further comprising:
obtaining a location of the identified at least one ICIC-engaged WDCS cell;
obtaining a location of the identified at least one remote unit in the WDCS receiving the downlink communications signals potentially transmitted by the at least one neighboring cell to the WDCS; and
determining the cell assignment configuration for the WDCS based on reassigning the at least one non-ICIC-engaged remote unit in the WDCS currently assigned to a non-ICIC-engaged WDCS cell, the location of the at least one ICIC-engaged WDCS cell, and the location of the identified at least one remote unit receiving the downlink communications signals potentially transmitted by the at least one neighboring cell to the WDCS.

19. A wireless distribution communications system (WDCS), comprising:
a plurality of WDCS cells each configured to communicate a downlink communications signal for a cell service to a client device and receive an uplink communications signal for the cell service from the client device;
a central unit configured to:
distribute the downlink communications signals from the plurality of WDCS cells over at least one downlink communications medium to a plurality of remote units;
distribute the uplink communications signals received from the plurality of remote units over at least one uplink communications medium to the plurality of WDCS cells;
the plurality of remote units each configured to:
receive at least one downlink communications signal over the at least one downlink communications medium from the central unit;
distribute the received at least one downlink communications signal to at least one client device;
receive at least one uplink communications signal from the at least one client device; and
distribute the received at least one uplink communications signal from the at least one client device over the at least one uplink communications medium to the central unit; and
a cell assignment configuration circuit configured to:
identify at least one remote unit among the plurality of remote units receiving the downlink communications signals potentially transmitted by at least one neighboring cell to at least one WDCS cell among the plurality of WDCS cells;
identify at least one ICIC-engaged WDCS cell among the plurality of WDCS cells in ICIC with the at least one neighboring cell based on the plurality of WDCS cells in the WDCS assigned to the at least one remote unit identified as receiving the downlink communications signals potentially transmitted by the at least one neighboring cell to the WDCS;
determine at least one non-ICIC-engaged remote unit assigned to the identified at least one ICIC-engaged WDCS cell and not identified as receiving the downlink communications signals transmitted by the at least one neighboring cell;
determine a cell assignment configuration for the plurality of remote units based on reassigning the at least one non-ICIC-engaged remote unit to a non-ICIC-engaged WDCS cell among the plurality of WDCS cells; and
configure a cell assignment of the at least one non-ICIC-engaged remote unit in the WDCS based on the determined cell assignment configuration.

20. The WDCS of claim 19, wherein the cell assignment configuration circuit comprises a plurality of cell assignment configuration inputs each coupled to a downlink communications medium among the at least one downlink communications medium;
the cell assignment configuration circuit further configured to receive the downlink communications signals distributed by the central unit to the plurality of remote units over the at least one downlink communications medium.

21. The WDCS of claim 19, further comprising:
at least one communications link coupling the plurality of WDCS cells to the at least one neighboring cell; and
wherein:
the plurality of WDCS cells are each configured to communicate ICIC messages with the at least one neighboring cell over the at least one communications link;
the cell assignment configuration circuit further comprises a plurality of cell configuration inputs each coupled to a communications link among the at least one communications link; and
the cell assignment configuration circuit is configured to identify the at least one remote unit in the WDCS receiving the downlink communications signals potentially transmitted by the at least one neighboring cell to the WDCS as the identified at least one remote unit receiving the downlink communications signals transmitted by the at least one neighboring cell to the WDCS, based on the received ICIC messages.

22. The WDCS of claim 19, further comprising:
at least one cell communications link coupling the plurality of WDCS cells to the cell assignment configuration circuit; and
wherein:
the cell assignment configuration circuit comprises a plurality of cell assignment configuration inputs each coupled to WDCS cell among the plurality of WDCS cells;
the plurality of WDCS cells are each configured to communicate cell messages over the at least one WDCS cell communications medium to the cell assignment configuration circuit; and
the cell assignment configuration circuit configured to identify the at least one remote unit in the WDCS receiving the downlink communications signals potentially transmitted by the at least one neighboring cell to the WDCS, based on the received cell messages.

23. The WDCS of claim 19, wherein the cell assignment configuration circuit comprises:
at least one signal analysis circuit comprising:
at least one signal analysis input each configured to receive the at least one downlink communications signal communicated to at least one remote unit in the WDCS; and
at least one signal analysis output;
the at least one signal analysis circuit configured to:

receive the at least one downlink communications signal communicated to the at least one remote unit in the WDCS on the at least one signal analysis input;

identify the at least one remote unit among the plurality of remote units in the WDCS receiving the downlink communications signals potentially transmitted by the at least one neighboring cell to the WDCS; and communicate on the at least one signal analysis output, at least one neighboring cell indicator indicating the at least one remote unit identified as receiving the at least one downlink communications signal potentially transmitted by the at least one neighboring cell; and a cell configuration circuit comprising:

a cell configuration input communicatively coupled to the at least one signal analysis output;

the cell configuration circuit configured to:

receive the at least one neighboring cell indicator on the cell configuration input;

identify the at least one ICIC-engaged WDCS cell in the WDCS in ICIC with the at least one neighboring cell based on the plurality of WDCS cells in the WDCS assigned to the at least one remote unit identified as receiving the downlink communications signals potentially transmitted by the at least one neighboring cell to the WDCS indicated in the at least one neighboring cell indicator;

determine the at least one non-ICIC-engaged remote unit assigned to the identified at least one ICIC-engaged WDCS cell and not identified as receiving the downlink communications signals potentially transmitted by the at least one neighboring cell, based on the at least one neighboring cell indicator;

determine the cell assignment configuration for the WDCS based on reassigning the at least one non-ICIC-engaged remote unit in the WDCS currently assigned to a non-ICIC-engaged WDCS cell; and configure the cell assignment of at least one non-ICIC-engaged remote unit in the WDCS based on the determined cell assignment configuration.

24. The WDCS of claim 23, wherein the at least one signal analysis circuit comprises a plurality of signal analysis circuits, wherein each remote unit among the plurality of remote units further comprises a signal analysis circuit among the plurality of signal analysis circuits.

25. The WDCS of claim 19 comprising a distributed antenna system (DAS);

wherein each remote unit among the plurality of remote units comprises a remote antenna unit comprising at least one antenna configured to distribute the received downlink communications signals to the at least one client device and receive the uplink communications signals from the at least one client device.

26. The WDCS of claim 19 comprising a remote radio head (RRH) system;

wherein each remote unit among the plurality of remote units comprises an RRH comprising at least one radio transceiver and at least one antenna, the at least one radio transceiver configured to transmit the received downlink communications signals to the at least one client device and receive the uplink communications signals from the at least one client device.

27. The WDCS of claim 19 comprising a small radio cell system;

wherein each remote unit among the plurality of remote units comprises a small radio cell comprising at least one radio transceiver and at least one antenna, the at least one radio transceiver configured to transmit the received downlink communications signals to the at least one client device and receive the uplink communications signals from the at least one client device.

28. The WDCS of claim 19, wherein the at least one downlink communications medium and the at least one uplink communications medium comprise the same at least one communications medium.

29. The WDCS of claim 19, wherein the at least one neighboring cell comprises at least one outdoor neighboring cell, and the plurality of WDCS cells comprise a plurality of indoor WDCS cells.

30. The WDCS of claim 19, wherein:

the central unit comprises:

at least one electrical-to-optical (E-O) converter configured convert the downlink communications signals comprising electrical downlink communications signals from the plurality of WDCS cells into optical downlink communications signals; and at least one optical-to-electrical (O-E) converter configured convert the uplink communications signals comprising optical uplink communications signals received from the plurality of remote units over the at least one uplink communications medium into electrical uplink communications signals;

the central unit configured to:

distribute the optical downlink communications signals over the at least one downlink communications medium comprising at least one optical downlink communications medium to the plurality of remote units; and distribute the electrical uplink communications signals to the plurality of WDCS cells;

the plurality of remote units each comprising:

at least one optical-to-electrical (O-E) converter configured convert the optical downlink communications signals received over the at least one optical downlink communications medium from the central unit into the electrical downlink communications signals;

at least one electrical-to-optical (E-O) converter configured convert the electrical uplink communications signals received from the client device into the optical uplink communications signals; and the plurality of remote units each configured to:

receive the optical downlink communications signals over the at least one optical downlink communications medium from the central unit;

distribute the electrical downlink communications signals to a client device;

receive the electrical uplink communications signals from a client device; and distribute the optical uplink communications signals over at least one optical uplink communications medium to the central unit.

* * * * *